(12) United States Patent
Yi

(10) Patent No.: US 12,536,219 B2
(45) Date of Patent: Jan. 27, 2026

(54) DIGITAL CONTAINER FILE FOR MULTIMEDIA PRESENTATION

(71) Applicant: Cobalt Inc., Seoul (KR)

(72) Inventor: Haeil Yi, Seoul (KR)

(73) Assignee: Cobalt Inc., Seoul (KR)

( * ) Notice: Subject to any disclaimer, the term of this patent is extended or adjusted under 35 U.S.C. 154(b) by 0 days.

(21) Appl. No.: 18/786,188

(22) Filed: Jul. 26, 2024

(65) Prior Publication Data

US 2025/0036676 A1 Jan. 30, 2025

Related U.S. Application Data

(60) Provisional application No. 63/529,351, filed on Jul. 27, 2023.

(51) Int. Cl.
*G06F 3/048* (2013.01)
*G06F 16/41* (2019.01)
*G06F 16/438* (2019.01)

(52) U.S. Cl.
CPC .......... *G06F 16/4393* (2019.01); *G06F 16/41* (2019.01)

(58) Field of Classification Search
CPC .............................. G06F 16/4393; G06F 16/41
See application file for complete search history.

(56) References Cited

U.S. PATENT DOCUMENTS

| | | | |
|---|---|---|---|
| 6,636,238 B1 | 10/2003 | Amir et al. | |
| 6,665,835 B1 | 12/2003 | Gutfreund et al. | |
| 8,074,251 B2 | 12/2011 | Aoki et al. | |
| 8,381,086 B2 | 2/2013 | Li et al. | |
| 8,665,320 B2 | 3/2014 | Holley | |
| 9,319,448 B2 | 4/2016 | Chen et al. | |
| 9,875,224 B1 * | 1/2018 | VanBlon | G06F 40/103 |

(Continued)

FOREIGN PATENT DOCUMENTS

| | | |
|---|---|---|
| CN | 109862302 A | 6/2019 |
| CN | 111581938 A | 8/2020 |

(Continued)

OTHER PUBLICATIONS

One Skill PowerPoint, "How to Create a Video in PowerPoint Video in Text", Jun. 17, 2021, YouTube, https://www.youtube.com/watch?v=hz3YvteLaC4.

(Continued)

*Primary Examiner* — Rashawn N Tillery
(74) *Attorney, Agent, or Firm* — K&L Gates LLP

(57) ABSTRACT

Systems and methods are disclosed for generating, transmitting, reproducing, and integrating multimedia contents for a presentation. An example method includes providing a presentation document comprising a plurality of slides (e.g., a first slide and a second slide), and generating multimedia data of a presentation, including a first audio datum, a first video datum, a second audio datum and a second video datum. The multimedia data may be transmitted to an audience device for reproduction of the multimedia presentation such that: each of the first audio datum, the first video datum, the second audio datum and the second video datum is individually transmitted to the audience device, along with slide information indicative of one of the plurality of slides with which it is associated and time information indicative of a time at which each multimedia datum is to be played back.

22 Claims, 21 Drawing Sheets

(56) References Cited

U.S. PATENT DOCUMENTS

| | | | |
|---|---|---|---|
| 11,200,600 B2 | 12/2021 | Miller et al. | |
| 11,321,381 B2 | 5/2022 | Flider et al. | |
| 11,880,921 B2 | 1/2024 | Yi | |
| 2002/0036694 A1 | 3/2002 | Merril | |
| 2002/0120939 A1 | 8/2002 | Wall et al. | |
| 2003/0090506 A1 | 5/2003 | Moore et al. | |
| 2004/0205478 A1 | 10/2004 | Lin et al. | |
| 2005/0044499 A1 | 2/2005 | Allen et al. | |
| 2006/0288389 A1 | 12/2006 | Deutscher et al. | |
| 2007/0186166 A1 | 8/2007 | Anderson et al. | |
| 2007/0294424 A1* | 12/2007 | Englund | G09B 7/02 709/231 |
| 2008/0005652 A1 | 1/2008 | Krishnaswamy et al. | |
| 2008/0120546 A1 | 5/2008 | Pulier | |
| 2008/0126943 A1* | 5/2008 | Parasnis | G06Q 10/10 715/730 |
| 2008/0195981 A1* | 8/2008 | Pulier | G11B 27/034 715/974 |
| 2008/0263010 A1* | 10/2008 | Roychoudhuri | H04M 3/567 348/E7.083 |
| 2008/0288890 A1 | 11/2008 | Anderson et al. | |
| 2009/0077460 A1 | 3/2009 | Li et al. | |
| 2009/0157205 A1 | 6/2009 | Inoue et al. | |
| 2011/0107214 A1 | 5/2011 | Kouznetsov et al. | |
| 2011/0210083 A1 | 9/2011 | Scott et al. | |
| 2011/0210983 A1* | 9/2011 | Theimer | H04N 21/4122 348/E7.003 |
| 2014/0281852 A1* | 9/2014 | Wolfram | G06F 40/106 715/202 |
| 2015/0120278 A1* | 4/2015 | Waibel | G06F 40/166 704/2 |
| 2015/0244758 A1 | 8/2015 | Kolowich et al. | |
| 2017/0003828 A1 | 1/2017 | Gorman | |
| 2019/0141395 A1* | 5/2019 | Meredith | H04L 65/612 |
| 2023/0237720 A1* | 7/2023 | Yi | G11B 27/105 715/202 |

FOREIGN PATENT DOCUMENTS

| | | |
|---|---|---|
| WO | 2014031699 A1 | 2/2014 |
| WO | 2020258907 A1 | 12/2020 |

OTHER PUBLICATIONS

Harald Sack et al., Automated Annotation of Synchronized Multimedia Presentations, Friedrich-Schiller-Universitat Jena, Germany, 2006.

Internaitonal Search Report dated May 10, 2023 in International Application No. PCT/US23/11627.

International Preliminary Report on Patentability dated May 9, 2024 in International Application No. PCT/US2023/011627.

Non-Final Office Action issued to related U.S. Appl. No. 18/420,598, dated Aug. 7, 2024, 20 pages.

International Search Report and Written Opinion issued to related PCT Application No. PCT/US2024/039920, dated Oct. 18, 2024, 15 pages.

* cited by examiner

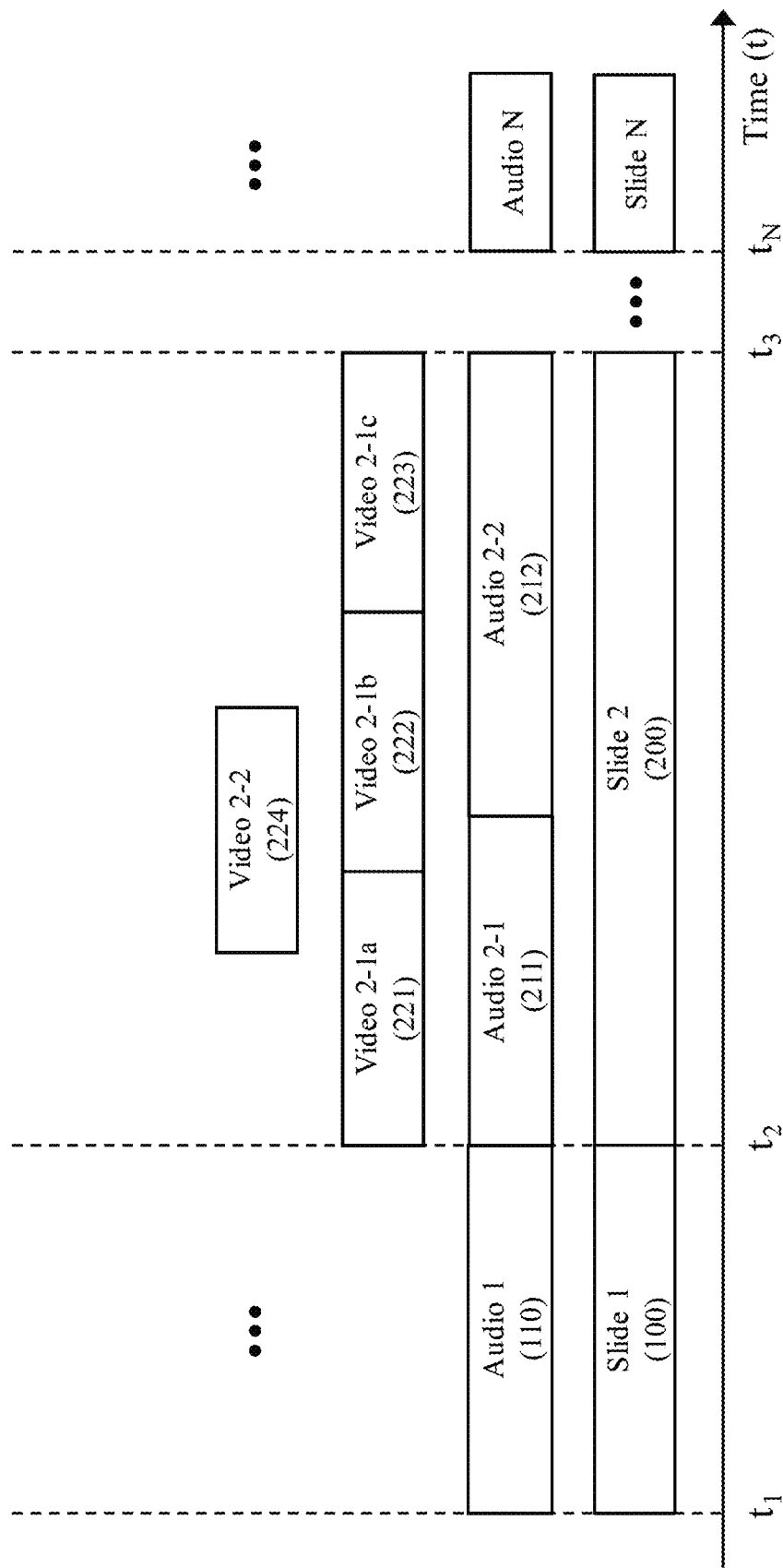

FIG. 15

Page (1500)
Slide Size: 1920 x 1080
Language: English
Slide ID: 003

Video 1 (1110)
Time (1111)
00:30 - 02:00
Location (1112)
(1330,700)–(1830, 1000)

Audio 1 (1140)
Time
00:00 - 00:30
Location
(0,0) – (0,0)

Visual Object (1160)
Time
01:00 - 02:00
Location
(240,450)–(670, 700)

Screen of audience device (t = 01:30)

(0,0) — (1920, 0) — (1920, 1080) — (0, 1080)

Slide 003
(entire screen background)

Video 2 (1120)
Location:
(1330,700) -- (1830, 1000)

Script (1130)
Location: (150, 850) -- (1080, 1000)

*FIG. 19*

DIGITAL CONTAINER FILE FOR MULTIMEDIA PRESENTATION

INCORPORATION BY REFERENCE TO ANY PRIORITY APPLICATIONS

Any and all applications for which a priority claim is made in the Application Data Sheet are hereby incorporated by reference in their entirety.

BACKGROUND

Multimedia contents of a presentation typically includes a presentation document (e.g., PowerPoint document), audio (e.g., featuring the presenter's voice), video (e.g., featuring the presenter), and markings (e.g., annotations) made by the presenter on the presentation document. Typically, visual contents of the presentation document, such as video and marking, are combined together to form image frames which are transmitted to audience devices for reproduction. Once combined in the form of image frames, the components are not separable in their original forms. Generally, the size of the combined image frames is relatively large even if compressed. Effective distribution of multimedia presentation contents may be difficult or limited in the areas where the data transmission infrastructure is not very good.

Various embodiments are presented herein that address one or more of these shortcomings.

SUMMARY

The present disclosure provides new and innovative systems and methods for generating, transmitting, reproducing, and integrating multimedia contents for a presentation. In an example, a method of processing a multimedia presentation is disclosed. The method may be performed by a computing device having one or more processors. The method may include providing a presentation document comprising a plurality of slides. The plurality of slides may include, for example, a first slide and a second slide. The method may further include generating multimedia data of a presentation. The presentation may be performed by at least one presenter using the presentation document. The multimedia data may include audio and video data, for example, a first audio datum, a first video datum, a second audio datum and a second video datum. The first audio datum may be associated with the first slide and configured for reproducing a first audio captured while the first slide is displayed during the presentation. The first video datum may be associated with the first slide and configured for reproducing a first video captured while the first slide is displayed during the presentation. The second audio datum may be associated with the second slide and configured for reproducing a second audio captured while the second slide is displayed during the presentation. The second video datum may be associated with the second slide and configured for reproducing a second video captured while the second slide is displayed during the presentation.

The method may further include causing to transmit the multimedia data to an audience device for reproduction of the multimedia presentation such that: each of the first audio datum, the first video datum, the second audio datum and the second video datum is individually transmitted to the audience device, each of the first audio datum, the first video datum, the second audio datum and the second video datum is transmitted along with slide information indicative of one of the plurality of slides with which it is associated, the first video datum, when transmitted, is not combined or integrated with the first slide, the second video datum, when transmitted, is not combined or integrated with the second slide, the first video datum is transmitted along with first video time information indicative of a time at which the first video datum is to be played back, and the second video datum is transmitted along with second video time information indicative of a time at which the second video datum is to be played back.

In some aspects, the method may further include: causing to synchronize playing of the first audio datum and displaying of the first slide such that the first slide appears on a screen of the audience device or another device as the first audio datum starts to be played back; and causing to synchronize playing of the second audio datum and displaying of the second slide such that the second slide appears on the screen as the second audio datum starts to be played back.

In some aspects, the method may further include causing at least part of the plurality of slides comprising the first and second slides to be transmitted to the audience device prior to transmission of the multimedia data to the audience device; causing to load the at least part of the plurality of slides on a viewing computer program installed in the audience device for viewing the at least part of the plurality of slides prior to receipt of the first audio datum on the audience datum; and causing to synchronize playing of the first audio datum and displaying of the first slide such that the first slide appears on a screen of the audience device or another device as the first audio datum starts to be played back.

In some aspects, the second slide is immediately subsequent to the first slide in the presentation. The method may further include causing to transmit the first slide to the audience device; and subsequently causing to transmit the second slide to the audience device, wherein the first audio datum and the first video datum are transmitted to the audience device prior to transmission of the second slide.

In some aspects, the second slide may be immediately subsequent to the first slide in the presentation. The second audio datum may be transmitted to the audience device along with a second audio time information indicative of a time at which the second audio datum is to be played back. Furthermore, the time indicated by the second audio time information may be about a time at which playing of the first audio datum is completed.

In some aspects, the method may further include causing to synchronize playing of the first audio datum and displaying of the first slide such that the first slide appears on a screen of the audience device or another device as the first audio datum starts to be played back; and causing to synchronize playing of the second audio datum and displaying of the second slide such that the first slide is switched to the second slide on the screen as the second audio datum starts to be played back.

In some aspects, the method may further include causing to start playing the first video datum at the time indicated by the first video time information while the first slide is being displayed on the screen such that a first video of the first video datum is displayed on the screen together with the first slide; and causing to start playing the second video datum at the time indicated by the second video time information while the second slide is being displayed on the screen such that a second video of the second video datum is displayed on the screen together with the second slide.

In some aspects, the first video datum may be referred to as a first video datum configured for reproducing a video captured while the first slide is displayed during the presentation. The second video datum may be referred to as a second video datum configured for reproducing a video captured while the second slide is displayed during the presentation. The multimedia data may further include a first marking datum and a second marking datum. The first marking datum is associated with the first slide as containing at least one marking made on the first slide while the first slide is displayed during the presentation. Furthermore, the second marking datum may be associated with the second slide as containing at least one marking made on the second slide while the second slide is displayed during the presentation.

In some aspects, each of the first marking datum and the second marking datum is individually transmitted to the audience device. Each of the first marking datum and the second marking datum may be transmitted along with slide information indicative of one of the plurality of slides with which it is associated. The first marking datum, when transmitted, may not be combined or integrated with the first slide. The second marking datum, when transmitted, may not be combined or integrated with the second slide. The first marking datum may be transmitted along with first marking time information indicative of a time at which the first marking datum is to be played back. Furthermore, the second marking datum may be transmitted along with second marking time information indicative of a time at which the second marking datum is to be played back.

In some aspects, the first video datum may be referred to as a first marking datum configured for reproducing at least one marking made on the first slide while the first slide is displayed during the presentation. The second video datum may be referred to as a second marking datum configured for reproducing at least one marking made on the second slide while the second slide is displayed during the presentation. Furthermore, the first marking datum may include location information indicative of a location of a marking on the first slide and a time associated with the location.

In some aspects, the first marking datum may include thickness information indicative of a thickness of the marking and color information indicative of a color of the marking.

In some aspects, generating the multimedia data may include: capturing an audio during the presentation, in which the first slide is displayed and subsequently the first slide is replaced with the second slide; detecting a slide change in which the first slide is replaced with the second slide; creating the first audio datum using a first portion of the audio (the first audio) that ends at or about the slide change; and creating the second audio datum using a second portion of the audio (the second audio) that starts at or about the of the slide change.

In some aspects, the audio is provided by capturing the audio during the presentation. Moreover, the slide change may be detected and the first audio may be created while the presentation is being performed. Furthermore, the slide change can be detected based on an input by the at least one presenter or based on monitoring of displayed slides while the presentation is being performed. The first audio datum may be transmitted to the audience device by streaming while the presentation is being performed.

In some aspects, the multimedia data may be generated by: capturing an audio during the presentation, in which the first slide is displayed and subsequently the first slide is replaced with the second slide; detecting an addition of the first video occurred while the first slide is displayed during the presentation; creating the first video datum comprising the first video; and further creating the first video time information indicative of a time at or about which the first video is added.

In some aspects, the multimedia data may be generated by: providing at least one recording of the audio of the presentation, in which the first slide is displayed and subsequently the first slide is replaced with the second slide; providing at least one recording of a visual representation of the presentation which comprises a sequence of at least part of the plurality of slides; processing the visual representation of the presentation to detecting a slide change in which the first slide is replaced with the second slide; determining a time of the slide change relative to a reference point in the audio of the presentation; creating the first audio datum using a portion of the audio (the first audio) that ends at or about the time of the slide change; and creating the second audio datum using a portion of the audio (the second audio) that starts at or about the time of the of the slide change.

In an embodiment, a method for reproducing a multimedia presentation is disclosed. The method may be performed by a computing device (e.g., an audience device) having a memory and one or more processors. The method may include receiving a presentation document comprising a plurality of slides, including a first slide and a second slide; and receiving a first audio datum, a first video datum, a second audio datum and a second video datum individually and separately from the presentation document. Along with each of the first audio datum, the first video datum, the second audio datum and the second video datum, the computing device may receive slide information indicative of one of the plurality of slides with which it is associated. Along with the first video datum, the computing device may further receive first video time information indicative of a time at which the first video datum is to be played back. Furthermore, along with the second video datum, the computing device may further receive second video time information indicative of a time at which the second video datum is to be played back.

The method may further include playing a first audio of the first audio datum while displaying the first slide on a screen. Along with the first slide on the screen, the computing device may display a first video of the first video datum at or about the time indicated in the first video time information. Upon completion of playing of the first audio, the computing device may immediately play a second audio of the second audio datum. The computing device may display the second slide in replacement of the first slide on the screen as playing of the second audio. Furthermore, along with the second slide on the screen, the computing device may display a second video of the second video datum at or about the time indicated in the second video time information.

In some aspects, the method may further include loading the at least the part of the presentation document on a viewing computer program for viewing the at least the part of the presentation document prior to receiving the multimedia data comprising the first audio datum, the first video datum, the second audio datum, and the second video datum. The method may further include synchronizing playing of the first audio of the first audio datum and displaying the first slide such that the first slide appears on the screen as the first audio datum starts to be played back.

In some aspects, the method may further include identifying, based on the slide information, associations between: the first audio datum and the first slide, the first video datum and the first slide, the second audio datum and the second slide, and the second video datum and the second slide;

determining, based on the first video time information, the time at which the first video datum is to be played back; and determining, based on the first second time information, the time at which the first video datum is to be played back. In some aspects, the presentation document, the first audio datum, the first video datum, the second audio datum, and the second video datum may be stored within a database.

In some aspects, the received multimedia data may further comprise a first marking datum and a second marking datum. The first marking datum may be associated with the first slide, and the second marking datum may be associated with the second slide. The method may further include: along with the first marking datum, further receiving first marking time information indicative of a time at which the first marking datum is to be displayed as a first marking on the first slide; along with the first slide on the screen, further displaying the first marking of the first marking datum at or about the time indicated in the first marking time information; along with the second marking datum, further receiving second marking time information indicative of a time at which the second marking datum is to be displayed as a second marking on the second slide; and along with the second slide on the screen, further displaying the second marking of the second marking datum at or about the time indicated in the second marking time information.

In an example, a system for processing a multimedia presentation is disclosed. The system may include memory and one or more processors in communication with the memory. The memory may store instructions that, when executed by the one or more processors, may cause the one or more processors to perform one or more of the following steps: providing a presentation document comprising a plurality of slides which comprises a first slide and a second slide; generating multimedia data of a presentation performed by at least one presenter using the presentation document, wherein the multimedia data comprises a first audio datum, a first video datum, a second audio datum and a second video datum; wherein the first audio datum is associated with the first slide and configured for reproducing a first audio captured while the first slide is displayed during the presentation, the first video datum is associated with the first slide and configured for reproducing a first video captured while the first slide is displayed during the presentation, the second audio datum is associated with the second slide and configured for reproducing a second audio captured while the second slide is displayed during the presentation, and the second video datum is associated with the second slide and configured for reproducing a second video captured while the second slide is displayed during the presentation; and causing to transmit the multimedia data to an audience device for reproduction of the multimedia presentation such that: each of the first audio datum, the first video datum, the second audio datum and the second video datum is individually transmitted to the audience device, each of the first audio datum, the first video datum, the second audio datum and the second video datum is transmitted along with slide information indicative of one of the plurality of slides with which it is associated, the first video datum, when transmitted, is not combined or integrated with the first slide, the second video datum, when transmitted, is not combined or integrated with the second slide, the first video datum is transmitted along with first video time information indicative of a time at which the first video datum is to be played back, and the second video datum is transmitted along with second video time information indicative of a time at which the second video datum is to be played back.

In another embodiment a system for reproducing a multimedia presentation is disclosed. The system may include memory and one or more processors in communication with the memory. The memory may store instructions that, when executed by the one or more processors, may cause the one or more processors to perform one or more of the following steps: receiving a presentation document comprising a plurality of slides which comprises a first slide and a second slide; receiving a first audio datum, a first video datum, a second audio datum and a second video datum individually and separately from the presentation document; along with each of the first audio datum, the first video datum, the second audio datum and the second video datum, further receiving slide information indicative of one of the plurality of slides with which it is associated; along with the first video datum, further receiving first video time information indicative of a time at which the first video datum is to be played back; along with the second video datum, further receiving second video time information indicative of a time at which the second video datum is to be played back; playing a first audio of the first audio datum while displaying the first slide on a screen; along with the first slide on the screen displaying a first video of the first video datum at or about the time indicated in the first video time information; upon completion of playing of the first audio, immediately playing a second audio of the second audio datum; displaying the second slide in replacement of the first slide on the screen as playing of the second audio; and along with the second slide on the screen displaying a second video of the second video datum at or about the time indicated in the second video time information.

Aspects of the present invention provides a digital container file for multimedia presentation. In some aspects, the digital container file comprises one or more of (1) slide data, not in a video format, configured to provide a plurality of slides and comprising a first slide datum for a first slide and a second slide datum for a second slide that is subsequent to the first slide; (2) audio data comprising a first audio datum and a second audio datum, wherein the first audio datum is configured to provide a first audio and comprises a first audio time stamp for use in playing back the first audio, wherein the second audio datum is configured to provide a second audio and comprises a second audio time stamp for use in playing back the second audio; (3) video data comprising a first video datum and a second video datum, wherein the first video datum is configured to provide a first video and comprises a first video time stamp for use in playing back the first video, wherein the second video datum is configured to provide a second video and comprises a second video time stamp for use in playing back the second video; and (4) visual object data, not in a video format, comprising a first-slide visual object datum associated with the first slide and a second-slide visual object datum associated with the second slide.

In some aspects, the first-slide visual object datum is configured to provide at least one first-slide visual object to be displayed together with the first slide and comprising at least one first-slide visual object time stamp for use in displaying the at least one first-slide visual object while the first slide is being displayed.

In some aspects, the second-slide visual object datum is configured to provide at least one second-slide visual object to be displayed together with the second slide and comprising at least one second-slide visual object time stamp for use in displaying the at least one second-slide visual object while the second slide is being displayed.

In some aspects, the first audio datum is associated with the first slide such that the first audio is to be played back while the first slide is being displayed, wherein the first video datum is associated with the first slide such that the first video is to be played back while the first slide is being displayed. Further in some aspects, the digital container file comprises a plurality of pages comprising a first page and a second page, wherein the first page comprises the first slide datum, the first audio datum, the first video datum, and the first-slide visual object datum, wherein the second page comprises the second slide datum, the second audio datum, the second video datum, and the second-slide visual object datum. Further in some aspects, the second audio is set to be played back together with the second slide in accordance with the second audio time stamp, wherein the second video is set to be played back together with the second slide in accordance with the second video time stamp. Further in some aspects, the second audio time stamp is to substantially synchronize playing back of the second audio with switching the first slide to the second slider, wherein the second video time stamp is to substantially synchronize playing back of the second video with switching the first slide to the second slider.

In some aspects, the digital container file comprises slide sequence information that the second slide is immediately subsequent to the first slide, wherein the digital container file further is configured to switch the first slide to the second slide upon completion of at least of the first audio and the first video.

In some aspects, the digital container file comprises sequence information that the second slide is immediately subsequent to the first slide, wherein the digital container file further comprises a slide switching time relative to a reference time for switching from the first slide to second slide.

In some aspects, the digital container file is configured to generate a first video content featuring the first slide, the first video, and the at least one first-slide visual object, while neither the slide data nor the visual objects data are in a video format.

In some aspects, the at least one first-slide visual object comprises a first marking to be overlayed on the first slide, wherein the first-slide visual object datum comprises first position information indicative of a first coordinate value for the first marking and a first marking time stamp for generating the first marking on the first slide.

In some aspects, the slide data comprises multiple sets of slide datum comprising a first set in a first language and a second set in a second language, each of which comprises a plurality of still image slides.

In some aspects, the digital container file comprises a first set of pages and a second set of pages, wherein the first set comprises a first page and a second page for presentation in a first language, wherein the first page comprises the first slide datum, the first audio datum, the first video datum, and the first-slide visual object datum, wherein the second page comprises the second slide datum, the second audio datum, the second video datum, and the second-slide visual object datum, wherein the second set comprises a second-language equivalent of the first page in a second language of and a second-language equivalent of the second page in the second language.

Aspects of the present invention provides a method of generating a digital container file. In some aspects, the method comprises one or more steps of (1) providing a presentation document comprising a plurality of slides which comprises a first slide and a second slide; and (2) providing multimedia contents of a presentation performed by at least one presenter using the presentation document, wherein the multimedia contents comprise: a first audio recorded while the first slide is displayed, a first video captured while the first slide is displayed, at least one first-slide visual object displayed while the first slide is displayed, a second audio while the second slide is displayed, a second video while the second slide is displayed, and at least one second-slide visual object while the second slide is displayed.

In some aspects, the method of generating the digital container file further comprises generating one or more of (1) a first slide datum configured to provide the first slide, (2) a first audio datum configured to provide the first audio and comprising a first audio time stamp for use in playing back the first audio, (3) a first video datum configured to provide the first video and comprising a first video time stamp for use in playing back the first video, (4) a first-slide visual object datum configured to provide the at least one first-slide visual object to be displayed together with the first slide and comprising at least one first-slide visual object time stamp for use in displaying the at least one first-slide visual object while the first slide is being displayed, (5) a second slide datum configured to provide the second slide, (6) a second audio datum configured to provide the second audio and comprising a second audio time stamp for use in playing back the second audio, (7) a second video datum configured to provide the second video and comprising a second video time stamp for use in playing back the second video, (8) a second-slide visual object datum configured to provide at least one second-slide visual object to be displayed together with the second slide and comprising at least one second-slide visual object time stamp for use in displaying the at least one second-slide visual object while the second slide is being displayed.

In some aspects, the method of generating the digital container file further comprises one or more steps of (1) organizing the first slide datum, the first audio datum, the first video datum and the first-slide visual object datum in a first page; (2) organizing the second slide datum, the second audio datum, the second video datum, and the second-slide visual object datum in a second page; and (3) creating a digital container file comprising the first page and the second page.

Aspects of the present invention provides a method of reproducing a multimedia presentation using a container file. In embodiments, the method may include one or more steps of (1) receiving from a user's request for a presentation, (2) obtaining one or more container files of the presentation from the server 400—each container including one or more pages, (3) obtaining one or more slide(s) of the presentation when the slide(s) are not in the container files, (4) processing metadata of the container file(s) to determine or identify parameter(s) of the presentation playback including but not limited to a sequence of slides and page(s) corresponding to individual slides, (5) process metadata of the corresponding page(s) of a slide, to determine or identify parameter(s) of the presentation playback for the slide (6) presenting the slide referencing to element data of the corresponding page(s), (6) presenting elements of the corresponding page(s) along with the current slide, (7) switching to the next slide on completion of presentation playback of the current slide, and (8) repeating the steps of (5) to (7) until playback of the last slide is completed. In embodiments, a playback process of a presentation may include one or more steps other than the example steps, and may not include at least one of the example steps.

One aspect of the present invention provides a digital container file for multimedia presentation. The digital container file comprises one or more of (1) slide data for reproduction of a plurality of slides used during the previously performed presentation and comprising a first slide datum for a first slide and a second slide datum for a second slide that is subsequent to the first slide (2) audio data for reproduction of audios of the previously performed presentation, (3) video data for reproduction of videos of the previously performed presentation, and (4) visual object data for reproduction of visual objects generated and/or displayed during (or from) the previously performed presentation. The audio data comprises one or more of (1) a first audio datum configured for reproducing a first audio that was recorded during the previously performed presentation while the first slide was being displayed or referenced, (2) a first audio time stamp indicative of a first audio time for reproducing the first audio relative to at least one reference point while the previously performed presentation is to be reproduced, (3) a second audio datum configured for reproducing a second audio that was recorded during the previously performed presentation while the second slide was being displayed or referenced, and (4) a second audio time stamp indicative of a second audio time for reproducing the second audio relative to the at least one reference point or another reference point while the previously performed presentation is to be reproduced. In some aspects, the video data comprises one or more of (1) a first video datum configured for reproducing a first video that was recorded during the previously performed presentation while the first slide was being displayed or referenced, (2) a first video time stamp indicative of a first video time for reproducing the first video relative to the at least one reference point or another reference point while the previously performed presentation is to be reproduced, (3) a second video datum configured for reproducing a second video that was recorded during the previously performed presentation while the second slide was being displayed or referenced; and (4) a second video time stamp indicative of a second video time for reproducing the second video relative to the at least one reference point or another reference point while the previously performed presentation is to be reproduced. In some aspects, the visual object data comprises one or more of (1) a first visual object datum configured for reproducing a first visual object that was generated and/or displayed during (or from) the previously performed presentation while the first slide was being displayed, (2) a first visual object time stamp indicative of a first visual object time for reproducing the first visual object relative to the at least one reference point or another reference point while the previously performed presentation is to be reproduced. (3) a second visual object datum configured for reproducing a second visual object that was generated and/or displayed during the previously performed presentation while the second slide was being displayed, and (4) a second visual object time stamp indicative of a second visual object time for reproducing the second visual object relative to the at least one reference point or another reference point while the previously performed presentation is to be reproduced. In some aspects, the first slide datum and the second slide datum are not in a video format. In some aspects, the first visual object datum and the second visual object datum are not in a video format. In some aspects, the digital container file does not comprises a video datum in which the first visual object datum is combined with the first video in a video format. In some aspects, the previously performed presentation was performed by at least one presenter, the first audio feature the at least one presenter's voice, and the first video features the at least one presenter.

In some aspects, the audio data comprises the first audio time stamp as part of the first audio datum and the second audio time stamp as part of the second audio datum.

In some aspects, the video data comprises the first video time stamp as part of the first video datum and the second video time stamp as part of the second video datum.

In some aspects, the visual object data comprises the first visual object time stamp as part of the first visual object datum and the second visual object time stamp as part of the second visual object datum.

In some aspects, the other reference point that the second audio time is relative to is different from the other reference point that the second video time is relative to.

In some aspects, the other reference point that the second audio time is relative to is identical to the other reference point that the second video time is relative to.

In some aspects, the first audio time and the second audio time are relative to the same reference time.

In some aspects, the first audio time is at or about a point at which the first slide is to be displayed while the previously performed presentation is reproduced.

In some aspects, the second audio time is at or about a point at which the first slide is switched to the second slide while the previously performed presentation is reproduced.

In some aspects, the digital container file comprises a plurality of pages comprising a first page and a second page. Further in some aspects, the first page comprises the first slide datum, the first audio datum, the first video datum, and the first visual object datum. Further in some aspects, the second page comprises the second slide datum, the second audio datum, the second video datum, and the second visual object datum. The digital container file may comprise slide sequence information indicating that the second slide is immediately subsequent to the first slide, and the slide sequence information may be located neither in the first page nor in the second page.

In some aspects, the digital container file comprises slide sequence information indicating that the second slide is immediately subsequent to the first slide, the digital container file is configured to switch the first slide to the second slide upon completion of reproducing the previously performed presentation for the first slide.

In some aspects, the digital container file comprises slide sequence information indicating that the second slide is immediately subsequent to the first slide, the digital container file further comprises a first-second slide switching time stamp indicative of a first-second slide switching time relative to the at least one reference point or another reference point for switching from the first slide to second slide while the previously performed presentation is to be reproduced. Further in some aspects, the slide sequence information is located neither in the first page nor in the second page, and the first-second slide switching time stamp is located neither in the first page nor in the second page.

In some aspects, the digital container file comprises slide sequence information indicating that the second slide is immediately subsequent to the first slide, and the digital container file further is configured to switch the first slide to the second slide upon completion of at least of the first audio and the first video.

In some aspects, the digital container file comprises slide sequence information indicating that the second slide is immediately subsequent to the first slide, the digital container file further comprises a first-second slide switching time stamp indicative of a first-second slide switching time relative to the at least one reference point or another reference point for switching from the first slide to second slide while the previously performed presentation is to be reproduced.

In some aspects, the digital container file is configured to generate a first video content featuring the first slide, the first video, and the first visual object, even if neither the first slide datum nor the first visual object datum is in a video format.

In some aspects, the first visual object comprises a first marking to be overlaid on the first slide, and the first visual object datum comprises first position information indicative of a first coordinate value for the first marking and a first marking time stamp for generating the first marking on the first slide.

In some aspects, the slide data comprises multiple sets of slide datum comprising a first set in a first language and a second set in a second language, and the first set comprise one or more slides in the first language and the second set comprise a second-language equivalent of the one or more slides.

In some aspects, the digital container file comprises a first set of pages and a second set of pages. The first set may comprise a first page and a second page for presentation in a first language. The first page may comprise the first slide datum, the first audio datum, the first video datum, and the first visual object datum. The second page may comprise the second slide datum, the second audio datum, the second video datum, and the second visual object datum. The second set may comprise a second-language equivalent of the first page in a second language of and a second-language equivalent of the second page in the second language.

In some aspects, the each of the plurality of slides is a still image slide. In some aspects, the previously performed presentation was performed by at least one presenter with no other audience, wherein the first audio and the second audio comprise voice of the at least one presenter but no reaction from audience.

Aspects of the present invention provides a method of generating a digital container file. In some aspects, the method comprises providing a presentation document comprising a plurality of slides which comprises a first slide and a second slide, and providing multimedia contents of a presentation performed by at least one presenter using the presentation document. In some aspects, the multimedia contents comprise one or more of (1) a first audio recorded during the presentation while the first slide is displayed or referenced, (2) a first video captured during the presentation while the first slide is displayed or referenced, (3) a first visual object generated and displayed during the presentation while the first slide is displayed or referenced, (4) a second audio recorded during the presentation while the second slide is displayed or referenced, (5) a second video recorded during the presentation while the second slide is displayed or referenced, and (6) a second visual object generated and displayed while the second slide is displayed or referenced.

In some aspects, the method further comprises generating one or more of (1) a first slide datum configured for reproducing the first slide, (2) a first audio datum configured for reproducing the first audio, (3) a first audio time stamp indicative of a first audio time to reproduce the first audio while the first slide is to be displayed during reproduction of the presentation, (4) a first video datum configured for reproducing the first video, (5) a first video time stamp indicative of a first video time to reproduce the first video while the first slide is to be displayed during reproduction of the presentation, (6) a first visual object datum configured for reproducing the first visual object, (7) a first visual object time stamp indicative of a first visual object time to reproduce the first visual object while the first slide is to be displayed during reproduction of the presentation, a second slide datum configured for reproducing the second slide, (8) a second audio datum configured for reproducing the second audio, (9) a second audio time stamp indicative of a second audio time to reproduce the second audio while the second slide is to be displayed during reproduction of the presentation, (10) a second video datum configured for reproducing the second video, (11) a second video time stamp indicative of a second video time to reproduce the second video while the second slide is to be displayed during reproduction of the presentation, (12) a second visual object datum configured for reproducing the second visual object, (13) a second visual object time stamp indicative of a second visual object time to reproduce the second visual object while the second slide is to be displayed during reproduction of the presentation.

In some aspects, the method further comprises one of more of (1) organizing the first slide datum, the first audio datum, the first video datum and the first visual object datum in a first page, (2) organizing the second slide datum, the second audio datum, the second video datum, and the second visual object datum in a second page, and (3) creating the digital container file comprising the first page and the second page.

In some aspects, the digital container file is generated substantially simultaneously as the at least one presenter is performing the presentation. In some aspects, the digital container file is generated for the presentation that was performed in the past. In some aspects, the digital container file is not a video file.

In an example, a non-transitory computer-readable medium for use on a computer system is disclosed. The non-transitory computer-readable medium may contain computer-executable programming instructions may cause processors to perform one or more methods or steps described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 2B illustrates another presentation timeline for a presentation of a presentation document and additional multimedia content according to an example embodiment of the present disclosure.

FIG. 14 is a variation of the page of FIG. 13.

FIG. 15 is a block diagram illustrating an example page according to an example embodiment of the present disclosure. FIG. 15 is a variation of the page of FIG. 13.

FIG. 19 illustrates another example display of an audience device generated using the page of FIG. 13.

DETAILED DESCRIPTION OF EXAMPLE EMBODIMENTS

Figure 1:
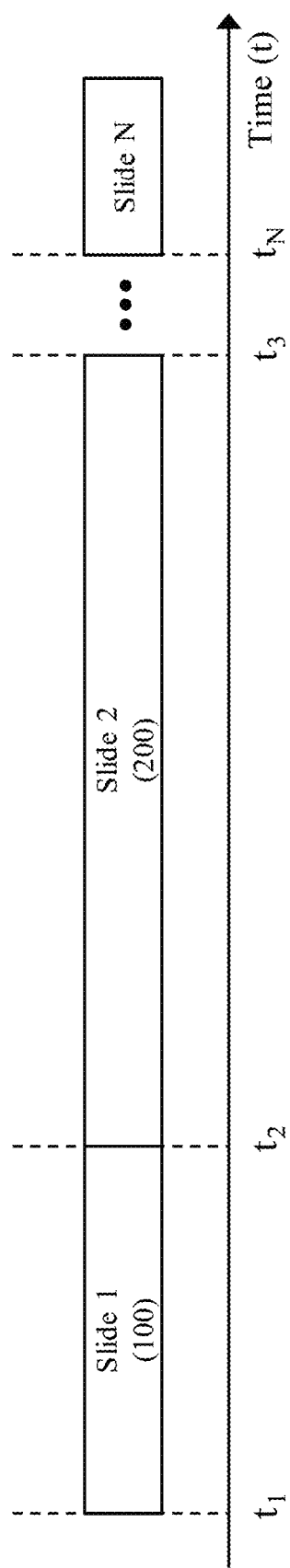
FIG. 1 illustrates a presentation timeline for a presentation of a presentation document comprising a plurality of slides according to an example embodiment of the present disclosure.

The presently disclosed subject matter now will be described and discussed in more detail in terms of some specific embodiments and examples with reference to the accompanying drawings, in which some, but not all embodiments of the invention are shown. Like numbers refer to like elements or parts throughout. The presently disclosed subject matter may be embodied in many different forms and should not be construed as limited to the specific embodiments set forth herein. Rather, these embodiments are provided so that this disclosure will satisfy applicable legal requirements. Indeed, many modifications and other embodiments of the presently disclosed subject matter will come to the mind of one skilled in the art to which the presently disclosed subject matter pertains. Therefore, it is to be understood that the presently disclosed subject matter is not to be limited to the specific embodiments disclosed and that modifications and other embodiments are intended to be included within the scope of the appended claims.

Current Issues in the Distribution of Presentations With Multimedia Content

A presentation often involves a presenter communicating to their audience through multimedia content, which typically includes a presentation document (e.g., PowerPoint doc.), audio, video, and markings made by the presenter on the presentation document. Typically, visual content of the presentation document, video and markings (e.g., notes or annotations added to the presentation document) are combined together to form image frames for streaming (or transmitting) to audience devices. Once combined in the form of image frames, the components are not easily separable into in their original forms. Generally, the size of the combined image frames is relatively large even if they are compressed, resulting in significant communication bandwidth requirements.

Effective distribution of multimedia presentation content may be difficult or limited in areas where the data transmission infrastructure is not well developed. Even if the audio for the presentation were to be separately delivered or streamed, similar networking constraints may result in latency or lack of synchronization between audio and visual elements. Furthermore, this approach does not address the issue of separating the various visual components once they have been combined.

Another challenge in multimedia presentations is the inability to modify or interact with individual components after they have been merged into image frames. This limitation restricts the audience's ability to customize their viewing experience or access specific parts of the presentation independently.

Therefore, there is a desire and need for a more effective system and method for generating, delivering, and reproducing presentations with multiple forms of multimedia content (referred to herein as multimedia presentations), so that the multimedia presentations can better withstand hardware and networking constraints and be easily separable into their respective components.

Addressing the Issues

Various embodiments of the present disclosure address one or more of the above-described shortcomings. In at least some embodiments, the present disclosure provides a system and method for generating and transmitting multimedia contents for a presentation, which include the presentation document, audio data, video data, and markings data, from a computing system or device associated with the presenter (referred to herein as the "presenter device") to a computing system or device associated with the intended recipient or audience (referred to herein as the "audience device") for integration and reproduction thereon. Each of the audio, video, and markings data may be segmented into smaller pieces (e.g., chunks) and may be transmitted piecemeal as opposed to transmitting the entire audio, video or markings for the entire presentation together. Each piece being transmitted—for example, each audio datum, each video datum and/or each markings datum—may be generated for the transmission and associated (e.g., via metadata) with a particular slide of the presentation material. Furthermore, some pieces being transmitted, for example, the markings datum or video datum associated with a particular slide, may be transmitted with time information indicative of when they are to be presented. In some embodiments, another computing system or device (e.g., a server) may facilitate the transmission of the presentation to the audience device by receiving the live or recorded presentation from the presenter device, generating the multimedia content associated with the presentation, and causing the separate transmission of the individual pieces of the presentation to the audience device, along with the time information and slide information for the various individual pieces. In another embodiment of the present disclosure, systems and methods are disclosed by which an audience device integrates or assembles (e.g., via computer executable instructions) the presentation document, audio datum, video datum and markings datum to reproduce the presentation.

Generating a Presentation

As an example, a presenter may use their presenter device to record a presentation on a desired topic. The presenter may record various aspects of the presentation as part of a process for creating the presentation before the presenter actually presents or distributes the presentation to an audience. Also or alternatively, the various components of the presentation may be captured or recorded while the presenter is presenting (e.g., during a live meeting (e.g., a ZOOM call)), and the various components of the presentation may be distributed to the audience device of the audience in real-time at predefined intervals, as will be described herein. The presenter may utilize a presentation document that comprises a plurality of slides. Each slide may correspond to and outline subtopics of the presentation and may be displayed in a form that facilitates retention of information by an audience (e.g., bullet points, graphs, etc.). The presenter may have the presentation document saved in their presentation device. As the presenter switches from one slide to another slide on the presentation document, the change in the slides can be detected (e.g., by the presenter device or another device (e.g., a server)) and that detection (referred to herein as "slide detection") can be used to determine the sequence of slides, the time points at which slides are replaced (e.g., by subsequent slides), and durations of time at which each slide is shown. While presenting, the presenter's voice narrating the presentation may be captured by the presenter device or another computing device (e.g., via a microphone). The captured audio may be stored, along with information about the respective slides to which the captured audio pertains (slide information for the audio) and information pertaining to the starting and ending times in the presentation when the audio occurs (time information for the audio). The presenter may choose to focus the presentation on themselves (e.g., via a camera) such that an audience would see a video of the presenter (e.g., in addition to the slide). The captured video may be stored, along with information about the respective slides to which the captured video pertains to (slide information for the video) and information pertaining to the starting and ending times in the presentation when the video occurs (time information for the video). The presenter may also choose to annotate the slides (e.g., underlining, circling, drawing an arrow to emphasize a point, etc.), for example, using a pen or other marking tool provided via a presentation software (e.g., Microsoft PowerPoint). The annotations (referred to as markings) may be captured and stored along with information pertaining to their association with the respective slides being annotated (slide information for the markings) and information pertaining to the starting and ending times in the presentation when those markings occur (time information for the markings).

Presentation Document

In embodiments, a slide of the presentation document may be a static image or page to be displayed during the presentation. A slide of the presentation document may include one or more dynamic elements (e.g., animations or effects in in Microsoft PowerPoint). A static presentation slide may correspond to a page in a printed or printable handout for the presentation.

Slide Not in Video Format

In embodiments, each of the slides is a background still image of the presentation. Each slide is not in not in a video format such that no dynamic component is includes in the slides. Dynamic components of the presentation other than background still images (slides) can be generated, stored, and transmitted in association with its corresponding slide, for example, as described in FIG. 4 and FIG. 8.

Transmitting Presentation

The presenter may desire to distribute the presentation to an audience. For example, if the presenter was delivering a live presentation to the audience (e.g., a ZOOM call), the audience may desire to obtain a copy of the presentation to replay at their leisure. Also or alternatively, the presenter may desire to submit the presentation to an audience that may not have seen or heard the presentation yet. As previously described, various components of the presentation (e.g., the slides, the audio, video, markings, etc.) that the presenter had prepared, or was delivering in real-time, may be separately captured and stored as individual multimedia datum (e.g., slide datum, audio datum, video datum, marking datum, etc.). Each individual multimedia datum, which may further include slide information and time information, may be separately transmitted to an audience device of the audience. Furthermore, the separate components may be transmitted in chunks that correspond to predefined presentation intervals. For example, in embodiments where the presenter is presenting to an audience in real-time (e.g., a ZOOM call), the presenter device or another device (e.g., a server) may transmit the separate components for a given presentation interval as soon as the presentation interval ends, before the presentation proceeds to the next presentation interval. In some aspects, the presentation intervals may correspond to the duration of time provided for each slide in the presentation. In such aspects, presentation intervals may be set based on the detections of slide changes by the presentation device or another device (e.g., server) while the presenter is presenting. However, presentation intervals may be additionally or alternatively based on other factors (e.g., predetermined time intervals (e.g., every 10 minutes), segments of audio or other multimedia content during the presentation). The slide data for a given slide, and any audio data corresponding to the slide, any video data corresponding to the slide, and/or any marking data corresponding to the slide may be separately transmitted to the audience device before slide data and any associated multimedia data for the next slide is transmitted. In some aspects, the presentation document itself may be transmitted to the audience device prior to any multimedia data associated with any given slide is transmitted to the audience device. Thus, the intended audience may efficiently receive presentations as they are prepared or delivered (e.g., slide by slide, or at each presentation intervals) and as separate multimedia content so that the audience can fully experience the multimedia presentation (e.g., without compromising on quality).

Reproducing Presentation

As discussed, each piece of multimedia data (corresponding to a given slide and/or a given presentation interval) may include information (e.g., metadata) about the slide with which the piece of multimedia data is associated with (slide information), and may, in some aspects, may further include information about a start and end time for that piece of multimedia data (time information). The slide information and time information for each piece of multimedia data allows the audience device to assemble and recreate the presentation. For example, as each slide data is received, the audience device may identify any subsequently received multimedia data as belonging to that slide (e.g., based on the slide information for the multimedia data), and may use the time information for that multimedia data to determine at what time point the multimedia data is to be played back. Thus, an audience listening and viewing the presenter's presentation may be able to simultaneously (e.g., in real-time), and/or at any time point after a live presentation, receive components and pieces of the presentation on their audience device to efficiently reassemble the presentation. Moreover, the transmission of individual components and pieces of a multimedia presentation in accordance with the segmentation techniques described herein overcomes bandwidth, lag time, and file size issues that are prevalent in conventional modes of multimedia presentation distribution. Furthermore, the inclusion of critical assembly information within each transmitted multimedia datum allows the audience to experience the presentation without compromising on any aspects of the presentation during its recreation.

Timeline for Presentation Document

Presentations delivered across devices have typically involved presentation documents (e.g., PowerPoint files) featuring a plurality of slides. A presentation may occur over a duration of time, and may involve a temporal component for each slide throughout the duration of the presentation. FIG. 1 illustrates a presentation timeline for a presentation of a presentation document comprising a plurality of slides according to an example embodiment of the present disclosure. For example, the presentation is shown to span a duration of time that is at least $t_n$. The presentation document is shown to comprise a plurality of slides, from slide 1 (100), to slide 2 (200), and all the way to slide N. During the duration of the presentation, the display of each slide may begin at a specific time of the presentation, and may be displayed until the specified time for the next slide to be displayed. Thus, as shown in FIG. 1, slide 1 (100) is displayed from $t_1$ to $t_2$, slide 2 (200) is displayed from $t_2$ until $t_3$, and slide N is displayed at least from $t_N$ (the end time for displaying slide N is not shown but slide N is indicated as being the end of the presentation document). In some embodiments, the end time for the display of a given slide need not coincide with the start time for the display of the subsequent slide. Furthermore, the duration of time for which a given slide is displayed need not be the same as the duration of time for which another slide is displayed. For example, slide 2 (200) is displayed for a longer time ($t_2$ to $t_3$) than the duration of time during which slide 1 (100) is displayed ($t_1$ to $t_2$), as shown by the lengths of the portions of the timeline provided for each slide in FIG. 1.

Timeline for Presentations With Additional Multimedia Content

Figure 2A:
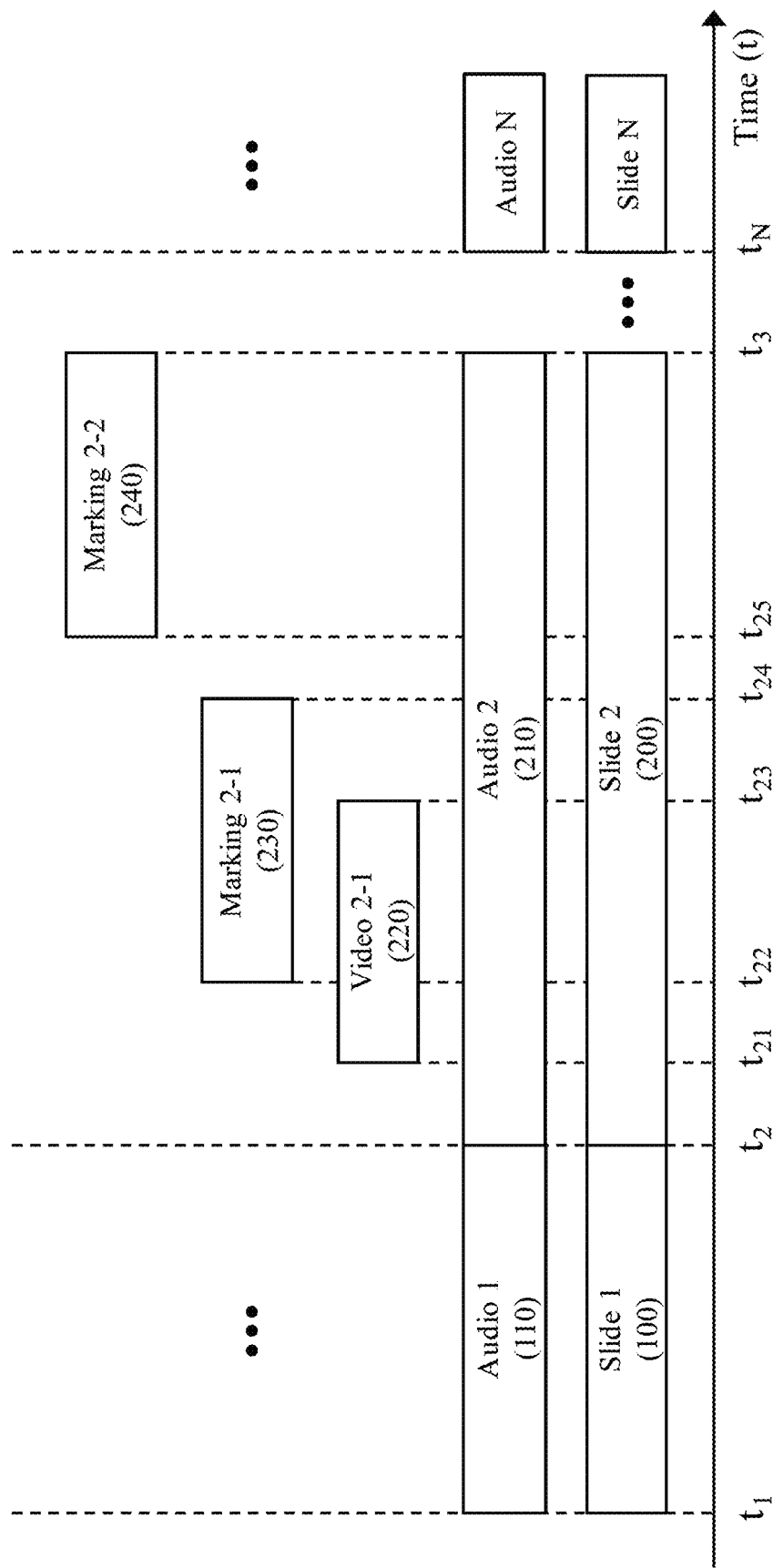
FIG. 2A illustrates a presentation timeline for a presentation of a presentation document and additional multimedia content according to an example embodiment of the present disclosure.

Although presentations delivered across devices have typically included presentation documents, presentations have often further included additional multimedia content such as videos, audio, and markings (e.g., on the slides). The additional multimedia content may accompany the presentation document so that they may both be presented, such that their presentations can result in specific overlapping timeframes. FIG. 2A illustrates a presentation timeline for a presentation of a presentation document and additional multimedia content according to an example embodiment of the present disclosure. As shown in FIG. 2A, along with the presentation of the presentation document comprising the plurality of slides (e.g., Slide 1 (100), Slide 2 (200), . . . . Slide N), the presentation also includes audio, video, and markings (e.g., annotations in the presentation document made by the presenter). The audio may be segmented to a plurality of audio segments occurring throughout the presentation, such as audio 1 (110), to audio 2 (210), and all the way to audio N, as shown. In the example shown in FIG. 2A, the start and end time of each audio segment coincides with the start and end time of each respective slide. That is, audio 1 (110) and slide (100) both begin at $t_1$ and end at $t_2$, slide 2 (200) and audio 2 (210) both begin at $t_2$ and end at $t_3$, and audio N and slide N both begin at $t_N$. However, consecutive segments of different multimedia content need not align along the same start and end times. For example, video 2-1 (220) is shown to begin at $t_{21}$ and end at $t_{23}$, which is only a portion of the timespan when audio 2 and slide 2 (200) are being presented. Similarly, in the example presentation shown in FIG. 2A, there are two markings, marking 2-1 (230) and marking 2-2 (240). However, while both of these markings occur between the start and end times of audio 2 (210) and slide 2 (200) of $t_1$ and $t_2$, the start and end times of marking 2-1 (230) is $t_{22}$ and $t_{24}$, respectively (i.e., starting and ending later than video 2-1 (220)), and the start and end time of marking 2-2 (240) is $t_{25}$ and $t_3$, respectively. As used herein, a marking may refer to visual annotations added to a slide or portion of the presentation document for a duration of time.

FIG. 2B illustrates another presentation timeline for a presentation of a presentation document and additional multimedia content according to an example embodiment of the present disclosure. In the example shown in FIG. 2B, in contrast to the example shown in FIG. 2A, the presentation timeline includes audio content whose start and end times are not aligned with the start and end times of each slide. For example, when slide 2 (200) is being presented from $t_2$ until $t_3$, audio 2-1 starts to be played at $t_2$ but ends earlier than $t_3$. Another audio, audio 2-2 (212), is played immediately after audio 2-1 ends, until $t_3$. The audio data corresponding to audio 2-1 and audio 2-2 may include time information indicating the start and end times of the respective audio content, in order to facilitate proper playback of the audio at the correct times during the presentation wherever the presentation is reproduced. Furthermore, in some embodiments, there may be two different multimedia content of the same type of multimedia content that can be played concurrently during the display of a slide. For example, as shown in the second presentation interval ($t_2$ to $t_3$) of FIG. 2B, video 2-1a (221) and video 2-1b (222) are played consecutively after one another, while video 2-2 (224) is also being played. After video 2-2 (224) ends, video 2-1c (223) is played until $t_3$ (the end time for the display of slide 2 (200). However, when video 2-1c begins to be played, video 2-2 (224) had already ended. Embodiments described herein allow for the distribution of individual and separate components of the presentation, such as video-2-1a (221), video-2-1b (222), video-2-1c (223), video-2-2 (224), and allow for the effective reproduction of the presentation at an audience device, by including critical time information and/or slide information for each component of the presentation.

Generating, Transmitting, Reproducing, and Integrating Multimedia Contents

Figure 3:
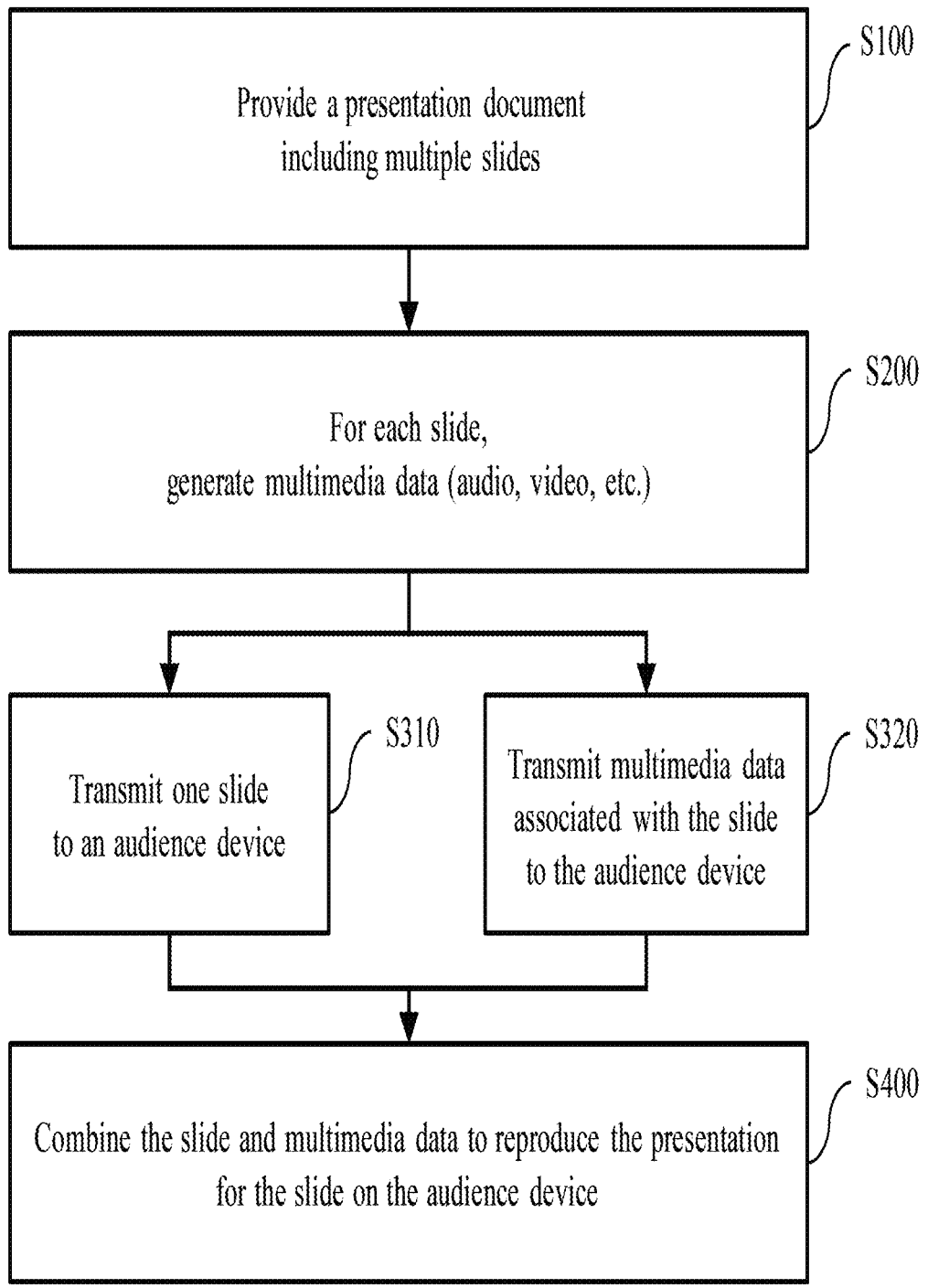
FIG. 3 is a flow chart illustrating a process for generating, transmitting, reproducing, and integrating multimedia contents for a presentation, according to an example embodiment of the present disclosure.

As previously discussed, conventional methods of distributing presentations involve combining the various multimedia components described above such that they are not separable in their original forms, resulting in the aforementioned size and bandwidth issues. FIG. 3 is a flow chart illustrating a process for generating, transmitting, reproducing, and integrating multimedia contents for a presentation, according to an example embodiment of the present disclosure. It is contemplated that in order to avail the techniques described herein to overcome the shortcomings of conventional methods for distributing presentations with multimedia content, the presentation is first created by a presenter. Thus, at step S100, a presentation may be initiated by generating or receiving a presentation document comprising a plurality of slides. For example, a presenter may draft slides for the presentation document using one or more software tools (e.g., Microsoft PowerPoint) at a computing device associated with the presenter (presenter device). Also or alternatively, a computing device or system (e.g., a server) may receive a presentation document (e.g., from the presenter device), and the computing device or system (e.g., the server) may then proceed to perform one or more steps presented herein for generating multimedia data and distributing the presentation. In various embodiments, the presentation may be initiated by combining the drafted slides into a single file and/or causing the drafted slides to be saved as a file (e.g., a .PPT file), such that the slides are arranged sequentially (e.g., each slide has an order of entry in the presentation). The combined slides may comprise a slideshow. In some embodiments, the presenter may specify a duration of time for the presentation (e.g., a duration of time for the slideshow), and may specify a duration of time that each slide of the presentation is to be displayed during the presentation.

Generating Multimedia Data

At step S200, multimedia data (e.g., audio, video, marking data, etc.) is generated for each slide. The multimedia data (e.g., audio, video, and marking data) can be additional to the slide data for each slide, as the slide data may also be considered as a form of multimedia data. For example, the presenter may insert, for any given slide, audio data to be played back or reproduced as audio during the presentation when the slide is being displayed during the presentation. The audio may comprise, for example, the presenter's own voice, a sound effect, music, narration, or the like. For example, an audio may include an audio portion of a move or clip, while a video may refer to the visual portion of the movie or clip. In some aspects, the presenter may set the start and end time for when the audio is to be played back during the presentation. The start and end time of the inserted audio (referred to herein as audio time information) need not coincide with the start and end time of the given slide. Similarly, for any given slide, the presenter may insert video data to be played back or reproduced as video when the slide is being displayed during the presentation. The video may comprise, one or more visual elements representing for example, any portion of a video of the presenter (e.g., while they are presenting the slide), a movie or television serial clip, a cartoon clip, an animation, a video recording, or the like. In some aspects, a video datum may comprise one or more visual data configured for reproducing the one or more visual elements of a video. The start and end time of the inserted video (referred to herein as audio time information) need not coincide with the start and end time of the given slide. Similarly, the presenter may choose to add marking data for any given slide. The marking may comprise any form of an annotation on the slide. In some aspects, the presenter may choose to specify a start and end time for the marking (referred to herein as marking time information), within the time window at which the slide is displayed, should a marking be displayed. In various embodiments, each multimedia data may be marked with slide information that indicates the slide with which the multimedia data is associated with. In some aspects, the slide information may be stored as metadata in the multimedia content. Furthermore, it is contemplated that not all slides need to have the additional multimedia data (e.g., audio, video, markings) associated with it, as a presenter may choose to present a given slide without any additional multimedia data accompanying it.

Generating Multimedia Data by Capturing From Live or Recorded Presentation

In some embodiments, multimedia data may be generated by the presenter device or another computing device based on the capture of various multimedia data from a recorded or live presentation by the presenter (e.g., a ZOOM Presentation). Such embodiments may facilitate the real-time generation of multimedia data (e.g., from an ongoing, live, or recently recorded presentation) and real-time transmission of the presentation (e.g., to the audience device). For example, a presenter may deliver a presentation using the presentation document and may include various audio (e.g., including the voice of the presenter themselves), video, and/or marking. The presentation may be recorded or may otherwise be captured by the presenter device or another computing device. In such embodiments, multimedia data may be generated by capturing each instance of audio, video, and/or marking used during the presentation (e.g., via image, and/or audio processing), and storing them as audio, video, and/or marking data. The slide being displayed for each instance of the audio, video, and/or marking may be identified (e.g., via image recognition by comparing to slides of the presentation document), and the identification may be used to store slide information associating each audio, video, and/or marking with a re,tive slide. Furthermore, the times at which the audio, video, and/or markings are present during the presentation may be recorded and stored as time information for the respective multimedia data.

In some aspects, the presenter device and/or another computing device (e.g., a server) may detect slide changes during the presentation (e.g., when a given slide is replaced with another slide) to determine orders for slides and/or time intervals for each slide. For example, one or more image processors may recognize (e.g., based on predefined aspect ratios), a rectangular or quadrilateral area as comprising the slide, and may detect (e.g., based on a difference in a significant portion of the pixels within that area) a change in a slide from one time unit to the next time unit. In some aspect, a given multimedia datum, may be generated using a portion of any multimedia (e.g., an audio, a video, or a marking) that ends at or about the slide change. Thus, another multimedia datum may be generated using a second portion of the multimedia that starts at or about the of the slide change. In some embodiments, the presenter device and/or another computing device may also detect additions of video and/or markings (e.g., by detecting changes in pixels within a smaller portion of a slide). In some aspects, the presenter device and/or another device may detect the slide change and create the multimedia datum based on the slide change while the presentation is being performed by the presenter (e.g., the multimedia data generation may occur in real or near real time). In some aspects, the slide change may be detected based on an input by the presenter (e.g., a selection to proceed to the next slide on a slide creating application (e.g., Microsoft PowerPoint). Also or alternatively, the slide change may be detected by monitoring the displayed slides while the presentation is being performed.

Marking Datum

In embodiments, a computing system tracks movement of a presentation pointer, a writing device, or a hand-held pointing device that the presenter uses for a presentation slide, and stores data of the movement in a way that another computing device can reproduce the movement when reproducing presentation of the slide. For example, data of marking 2-1 (230) may be stored using a video format, an animation clip, pointer movement vector(s), location(s) of the pointer with time information, location(s) of the pointer measured with a predetermined frequency, and combination thereof. A data other than the example can be used for a marking datum.

Transmitting Slide and Associated Multimedia Data

Figure 4:
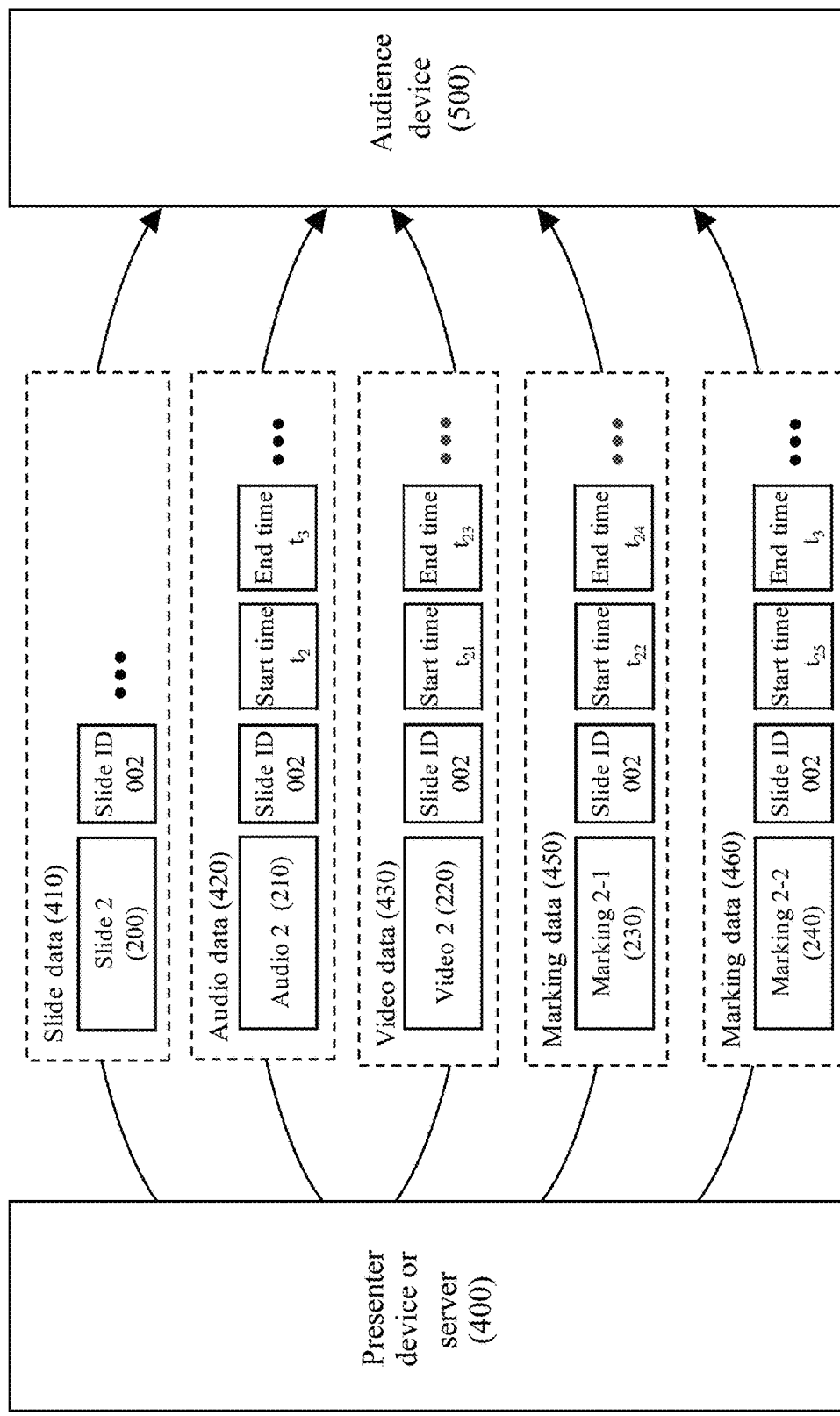
FIG. 4 is a block diagram illustrating the generation and transmission of multimedia contents for a presentation from a server to an audience device for reproduction thereon, according to an example embodiment of the present disclosure.

At step S310, a given slide of the plurality of slides may be transmitted to an audience device. Referring to FIG. 4, for example, a slide datum (410) including Slide 2 (200) and its Slide ID 002 is transmitted to the second computing device (500) Furthermore, at step S320, any multimedia data associated with the slide may also be transmitted to the audience device. Referring to FIG. 4, for example, the multimedia data (420-460) may be transmitted to the second computing device (500) for further processing to reproduce the presentation. The audience device may refer to the computing device associated with an intended audience or intended recipient of the presentation. In some aspects, the presenter device or a server may transmit, and the audience device may receive, the given slide before any corresponding multimedia data associated with the slide. In other aspects, the given slide need not be transmitted before the corresponding multimedia data. In some embodiments the datum corresponding to the given slide and/or any associated multimedia datum may be further fragmented into chunks. The chunks may be transmitted by the presenter device or server, and received by the audience device, separately to be reassembled into data for the given slide into the associated multimedia data. The chunks may facilitate more effective transmission over the communication network between the presenter device or server and the audience device, e.g., via adaptively loading a varying number of chunks into carriers depending on the network connectivity.

Reproducing Slide and Associated Multimedia Data

For each slide and any associated multimedia data received by the audience device, the audience device, at step 400, may combine the slide and multimedia data to reproduce the presentation for the slide on the audience device. For example, the audience device may detect slide information (e.g., stored as metadata) from a received multimedia data and may use the slide information to associate the received multimedia data with the slide referenced in the slide information. Furthermore, the audience device may use time information (e.g., an audio, video, or marking time information) to determine the start and end time for the multimedia data to be played back, relative to the start and end time of the slide with which the multimedia data is associated with. Steps S310, S320, and S400 may be repeated for other slides of the plurality of slides for the presentation, until all or most of the slides and multimedia data are combined. Thus, the audience device may synchronize playing of each multimedia datum with the display of the corresponding slides based on the slide information of the multimedia datum such that the slide appears on a screen of the audience device or another device as the multimedia datum starts to be played back. In some embodiments, reproducing any aspect of the presentation, for example, reproducing a given slide or multimedia data associated with the slide, may involve loading that aspect of the presentation on a viewing computer program installed in the audience device. In some aspects, a given slide may be loaded into the computer program before any associated multimedia data is loaded. The viewing computer program, when executed (e.g., by one or more processors of the audience device), may cause the audience device to play back the slide and multimedia (e.g., audio, video, or marking) corresponding to any multimedia data associated with the slide (e.g., audio data, video data, or marking data, respectively), in accordance with the time information for the multimedia data.

Transmitting Slide Data and Multimedia Data

As previously discussed, the systems and methods described herein for distributing multimedia contents for a presentation may overcome the issues of audience devices unable to receive or load large sizes for presentation files or separate presentations into their respective components. In some embodiments, the separate transmission of the various multimedia data and the slide data help to overcome these issues. FIG. 4 is a block diagram illustrating the transmission of multimedia contents for a presentation from a server to an audience device for reproduction thereon, according to an example embodiment of the present disclosure. As shown in FIG. 4, a first computing device 400 (e.g., a presenter device or another computing system (e.g., a server)) transmits various components of a presentation to a second computing device 500 (e.g., an audience device). A set of components being transmitted in any given time interval for transmission (referred to herein as transmission interval), may pertain to components of a presentation during a specific time interval of the presentation (referred to herein as presentation interval). In some aspects, the length of each presentation interval and/or each transmission interval may be corresponding to the length of time allotted for the presentation of each slide for the plurality of slides of a presentation document. In the example previously described in relation to FIG. 2A, during a presentation interval from $t_1$ to $t_2$, which corresponded to the presentation of Slide 1 (100) the components of the presentation were only Slide 1 (100) and Audio 1 (110). The components being transmitted in transmission interval of FIG. 4, however, are of the presentation interval from $t_2$ to $t_3$ in the presentation timeline FIG. 2A, which corresponds to the presentation of slide 2 (200). As previously described in relation to FIG. 2A, the components being presented at any point within the presentation interval from $t_2$ to $t_3$ included slide 2 (200), Audio 2 (210), Video 2 (220), marking 2-1 (230), and marking 2-2 (240). Accordingly, in the transmission interval shown in FIG. 4, the presenter device 400 transmits: slide data (410) based on slide 2 (200), audio data (420) based on Audio 2 (210), video data (430) based on Video 2 (220), marking data (450) based on marking 2-1 (230), and marking data (460) based on marking 2-2 (240).

However, although these multimedia data are shown in FIG. 4 as being transmitted during a transmission interval, each multimedia data (e.g., audio data (420), video data (430), marking data (450), and marking data (460)) may be individually transmitted, such that the transmission of one datum need not coincide, wait, or be sent together with another datum. Furthermore, the various multimedia data may not be combined or integrated with other multimedia data, at least for the transmission. In embodiments, two or more of the Slide 2's multimedia data (420-460) are combined for transmission to the second computing device 500. In embodiments, one or more of the Slide 2's multimedia data (420-460) can be transmitted to the s multimedia second computing device 500 while another of the Slide 2's multimedia data is being transmitted to the second computing device 500. In some embodiments, the multimedia data pertaining to an aspect of the presentation document itself for the given transmission interval, for example, slide data (410), may be transmitted to the second computing device 500 (e.g., audience device) before any additional multimedia data associated with the presentation is transmitted.

Selective Transmission of Multimedia Data Based on Network Bandwidth

In embodiments, some of the multimedia data of the slide may not be sent to the second computing device 500 when a current network bandwidth (or communication speed) between the first computing device 400 and the second computing device 500 is not enough. For example, the first computing device 400 obtains or measures a bandwidth of communication to the second computing device 500, determines that an undesirable pause or waiting is expected if the second computing device 500 waits for the video data 430, selects one or more elements of the multimedia data (excluding the video data 430) considering required bandwidth (or predetermined priority) of each element, transmits only the selected element(s) to the second computing device 500, and instruct the second computing device 500 to reproduce the presentation for the corresponding slide (Slide ID 002) without waiting for the video data 430 or any additional multimedia data. For example, the first computing device 400 may send, to the second computing device 500, a communication that video data 430 will not be sent and/or a list of multimedia data excluding video data 430 such that the second computing device 500 start to reproduce the presentation using Slide 2 without waiting for the video data 430. In embodiments, one or more factors other than network bandwidth can be considered for selective transmission of the multimedia data.

Transmitting Slide Data and Multimedia Data Rather Than Combined Video

In embodiments, the audience device 500 does not receive (or require) a video file or stream in which one or more of the multimedia data are combine or integrated with its corresponding slide. Rather, the audience device 500 may receive the slide data (410) and one or more of the multimedia data (420-460) separately and then initiate a processing to reproduce the presentation for Slide 2 (200) using the received data. As there is no transmission of a combined video or stream, transmission of slide data (S310) and transmission of multimedia data (S320) may be separate and independent, and also selective transmission of the multimedia data is possible.

Multimedia Data Can be Used to Identify Reproduce and/or Output the Respective Multimedia Content Each multimedia datum (e.g., audio datum, video datum, marking datum, etc.) comprises computer-executable instructions for reproducing and/or outputting a respective multimedia content (slide, audio video, and/or marking) and integrating the respective multimedia content with respect to other multimedia content (e.g., via time information). For example, audio data (420) includes time information for audio 2 (210), the time information indicated as the start time $t_2$ and the end time $t_3$. Video data (430) includes time information for video 2 (220), the time information indicated as the start time $t_{21}$ and the end time $t_{23}$. Marking data (450) includes time information for marking 2-1 (230), the time information indicated as the start time $t_{22}$ and the end time $t_{24}$. Marking data (460) includes time information for marking 2-2 (240), the time information indicated as the start time $t_{25}$ and the end time $t_3$. The time information (e.g., audio time information, video time information, or marking time information) may be indicative of a time at which the respective multimedia data, datum, and/or chunk is to be played back in the second computing device 500 (e.g., audience device). In some aspects, a given multimedia data need not include all or part of the time information when the start and end time is identical to the start and end time of the slide with which the multimedia data is associated with. For example, audio 2 (210) starts and ends at the same time as slide 2 (200) starts and ends, so audio data (410) need not include the time information. In such aspects, an absence of the time information may be indicative that the multimedia is to be played back through the entirety of the presentation interval for the associated slide (e.g., slide 2 (200)). By eliminating such redundant information and/or information that can be easily determined, the systems and methods described herein reduce the bandwidth sizes required for transmitting multimedia content for presentations.

Multimedia Data Can be Used to Identify Associations

Furthermore, each multimedia datum (e.g., slide datum, audio datum, video datum, marking datum, etc.) comprises computer-executable instructions for associating the respective multimedia content (e.g., the audio, video, or marking) with a slide and/or slide number of the presentation. For example, slide data (410) further include slide identification (ID) 002 indicating the order of slide 2 (200). Similarly, audio data (420), video data (430), marking data (450), and marking data (460) each contain slide information for their respective multimedia (e.g., audio 2 (210), video 2 (220), marking 2-1 (230), and marking 2-3 (240), the slide information associating each of the multimedia to Slide 2 (200) (e.g., via Slide ID 002). Thus, by segmenting the presentation into components (e.g., presentation documents, audio data, video data, markings, etc.), segmenting each component into pieces (e.g., based on presentation intervals based on when each slide is being presented), and supplying time information and slide information for each piece, the first computing device 400 (e.g., a presenter device or a server) facilitates an effective integration and reproduction of the presentation at the second computing device 500 (e.g., an audience device).

Multimedia Content Associated With Two or More Slides

It is also contemplated that various multimedia content, or their corresponding multimedia data, may be associated with more than one slide. For example, a given audio or video may be played while two or more slides of a presentation document is being displayed. In some embodiments, the multimedia content associated with more than one slide may be split in two (e.g., at a time point that coincides with a detected slide change), resulting in two multimedia content. Also or alternatively, in some embodiment, a different type of multimedia data (in lieu of the slide data) may be used as controlling and deciding the presentation intervals for the presentation. In such embodiments, rather than slide information for each multimedia data, there may be information associating each multimedia data to the said different multimedia data that controls and decides the presentation intervals. For example, if a presentation includes periods where slides are not shown, but there is still audio throughout the presentation, audio data may be used for the controlling multimedia data for setting presentation intervals, and to which other multimedia data may be associated with.

Display of Audience Device Showing Presentation

Figure 5:
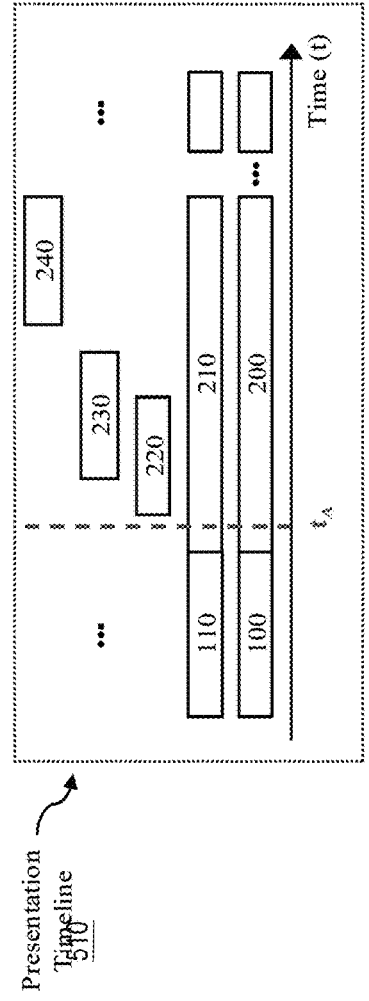
FIG. 5 illustrates an example display of an audience device showing a presentation, according to an example embodiment of the present disclosure.

As the various components and pieces of the presentation are transmitted to and received by the audience device, the audience device may load, synchronize, and play back the various components and pieces of the presentation. FIG. 5 illustrates an example display 500 of an audience device showing a presentation, according to an example embodiment of the present disclosure. In the example shown in FIG. 5, the audience device is playing back the presentation at a time point, $t_A$, when slide 2 (200) is being displayed, and audio 2 (210) is being played, as shown in the presentation timeline 510. The presentation timeline 510 shows that during time point $t_A$, the presenter has already finished presenting slide 1 (100), which had been displayed simultaneously with the playing back of audio 1 (110). However, the presentation timeline 510 also shows that the audience device will, after a short time, begin playing back video 2 (220) and presenting markings 2-1 (230). The presentation timeline 510 also shows that the audience device will, after a longer time, present marking 2-3 (240). The short time after $t_N$ will be a time point $t_B$ of the presentation, as shown in FIG. 6, while the longer time after $t_N$ will be a time point $t_C$ of the presentation, as shown in FIG. 7.

Figure 6:
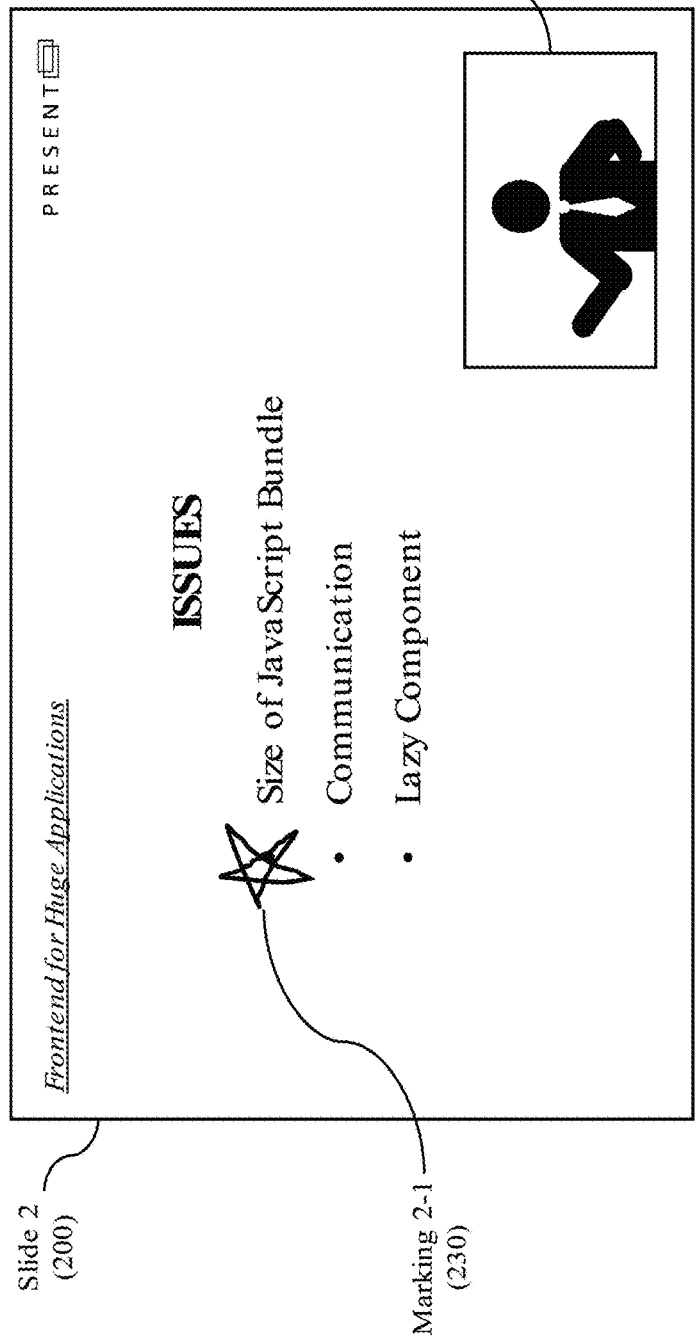
FIG. 6 illustrates an example display of an audience device showing a presentation with additional multimedia content, according to an example embodiment of the present disclosure.

Display of Audience Device Showing Presentation With Additional Multimedia Content FIG. 6 illustrates an example display of an audience device showing the presentation at another time point, and with additional multimedia content, according to an example embodiment of the present disclosure. Specifically, the display shown in FIG. 6 is of the presentation at time point $t_B$, which occurs later in the presentation timeline from $t_A$ of FIG. 5. The additional multimedia content shown in the display in FIG. 6, which is not shown in FIG. 5, is video 2 (220) and marking 2-1 (230), which is presented during time point $t_B$ but are not presented at time point $t_A$. The additional multimedia content nevertheless is associated with slide 2 (200) based on the slide information of the multimedia data for the additional multimedia content (e.g., video data (430) for video 2 (220) and marking data (450) for marking 2-1 (230)), as previously discussed in relation to FIG. 4. Thus, the additional multimedia content is being played while slide 2 (200) is being displayed. Furthermore, as slide 2 (200) and audio 2 (210) share the same start and end time, as shown in the presentation timeline 650, audio 2 is being played is being played while slide 2 (200) is displayed. As shown in FIG. 6, video 2 (220) is a recording of the presenter as they are presenting. Furthermore, marking 2-1 (230) is shown to be an annotation by the presenter where the first bullet point of slide 2 (200) is starred for emphasis. However, it is contemplated that the presenter can generate a marking using any form of annotation, including free form (e.g., simply using the pen tool to draw or write notes on the slide), shapes, textual emphases (e.g., bold, italics, underline), or the like.

Figure 7:
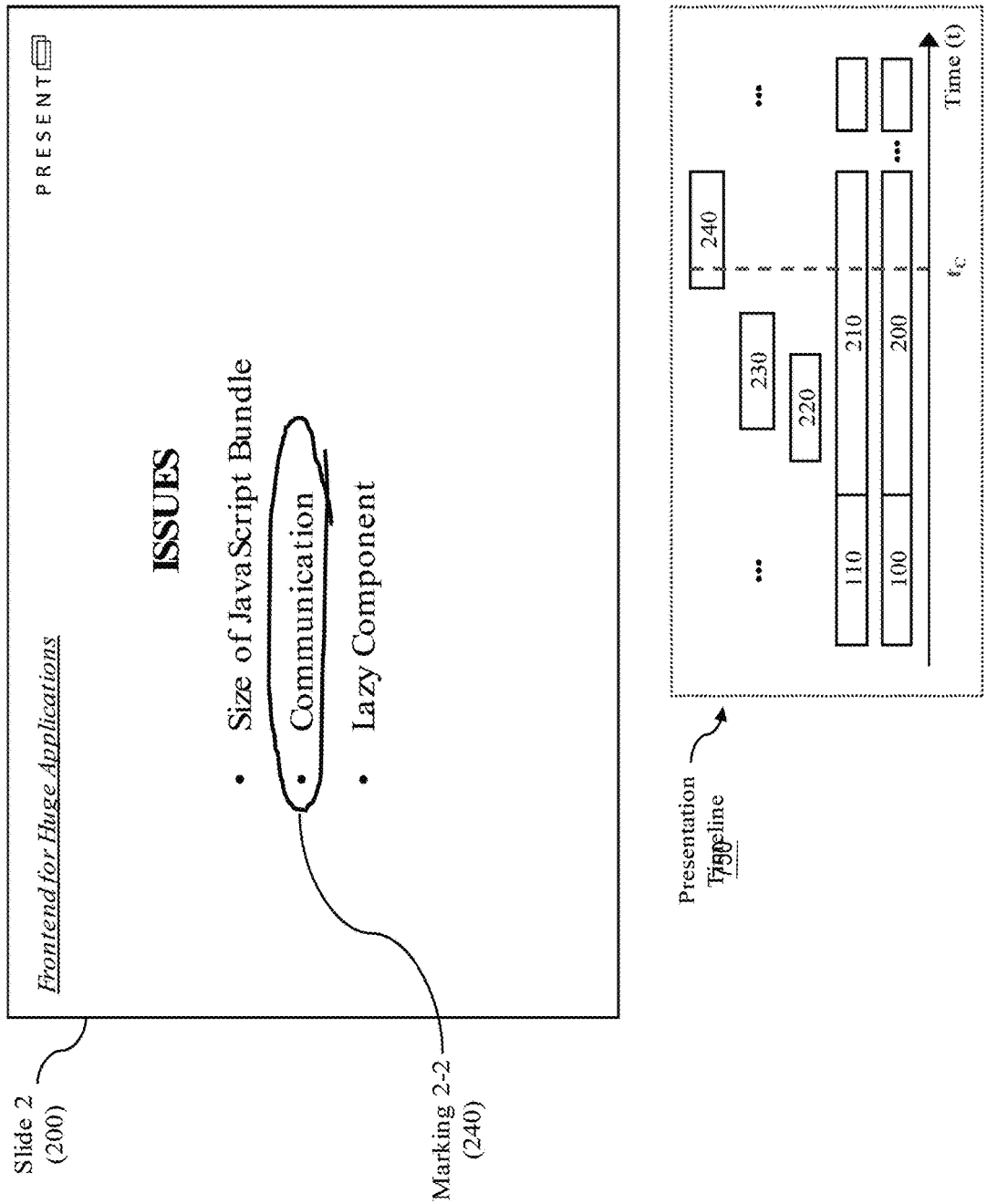
FIG. 7 illustrates an example display of an audience device showing a presentation with additional multimedia content, according to another example embodiment of the present disclosure.

FIG. 7 illustrates an example display of an audience device showing the presentation at yet another time point with additional multimedia content, according to another example embodiment of the present disclosure. Specifically, the time point for the presentation shown in FIG. 7 is time point $t_C$, which is later than the time point $t_B$ of the presentation shown in FIG. 6, which is later than the time point $t_A$ of the presentation shown in FIG. 5. The additional multimedia content shown in the display in FIG. 7, which is not shown in FIG. 5 or 6, is marking 2-2 (240), which is presented during time point $t_C$ but is not presented at time points $t_A$ or $t_B$. Furthermore, at time point $t_C$, video 2 (220) is no longer being played and marking 2-1 (230) is no longer being displayed. Nevertheless, marking 2-2 (240) is associated with slide 2 (200) based on the slide information of marking data (460) for marking 2-2 (240)) indicating slide ID 002, as previously discussed in relation to FIG. 4. Thus, marking 2-2 (240) is being displayed while slide 2 (200) is being displayed. Furthermore, as slide 2 (200) and audio 2 (210) share the same start and end time, as shown in the presentation timeline 750, audio 2 is being played is being played while slide 2 (200) is displayed. As shown in FIG. 7, marking 2-2 (240) is shown to be an annotation by the presenter where the second bullet point of slide 2 (200) is starred for emphasis. However, it is contemplated that the presenter can generate a marking using any form of annotation, including free form (e.g., simply using the pen tool to draw or write notes on the slide), shapes, textual emphases (e.g., bold, italics, underline), or the like. In some embodiments, for example, where a marking is a free form drawing, the marking data may include one or more of a thickness (e.g., line size) of the drawing, a color of the drawing, a texture of the drawing, a shade of the drawing, or the like.

Integration and Synchronization of a Presentation

Figure 8:
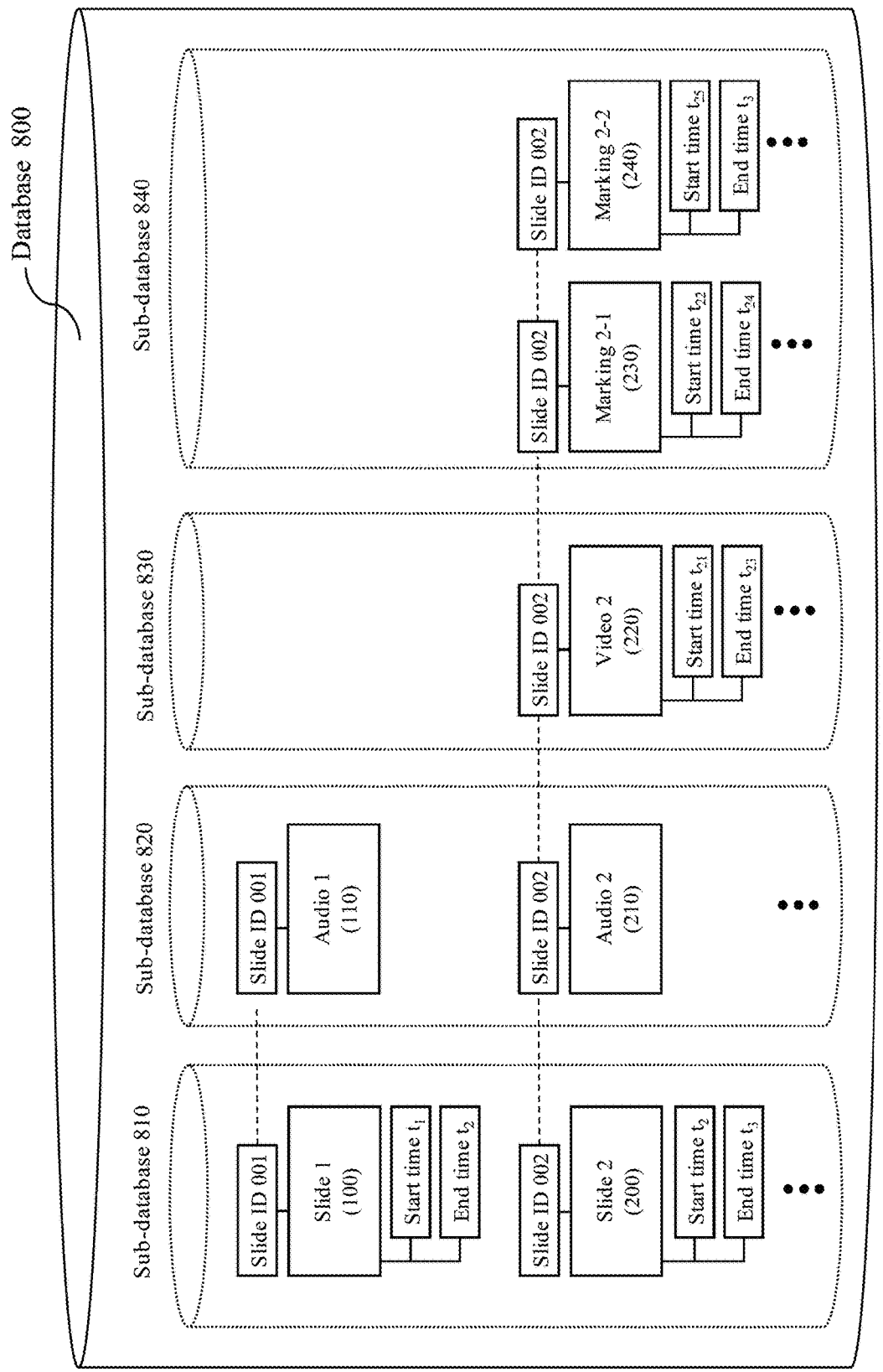
FIG. 8 is a block diagram illustrating an example database of a computing device for integrating and synchronizing multimedia data for a presentation, according to an example embodiment of the present disclosure.

The foregoing embodiments described above also allow the integration and synchronization of the presentation at the audience device or another computing device. As the audience device receives individual components and pieces of the presentation (e.g., via separate transmissions), the audience device may store the pieces and components in data structures that facilitate integration and synchronization. FIG. 8 is a block diagram illustrating an example database 800 of a computing device that is integrating and synchronizing multimedia data for a presentation, according to an example embodiment of the present disclosure. As shown in the FIG. 8, the database 800 may include a plurality of sub-databases for compartmentalizing multimedia data storage. In this example, sub-database 810 may be used to store slide data, sub-database 820 may be used to store audio data, sub-database 830 may be used to store video data, and sub-database 840 may be used to store marking data. In some embodiments, each sub-database may comprise a data structure that is customized to be able to store the respective form of multimedia data (e.g., slide audio, video, or marking data). Furthermore, as was described previously, since components and/or pieces of the presentation may be transmitted to the audience device separately, for example, in discrete transmission intervals, the audience device may store the components and/or pieces into the database 800 as they are received. For example, as the audience device receives multimedia data pertaining to the first presentation interval (e.g., from time $t_1$ to $t_2$ of the presentation timeline), the received multimedia data (e.g., slide 1 (100), and audio 1 (110)) may be stored in their respective sub-databases in a manner where the stored multimedia data is linked or otherwise associated with one another for belonging to the same presentation interval. As the audience device receives multimedia data pertaining to each subsequent presentation interval (e.g., from time $t_2$ to $t_3$ of the presentation timeline), the received multimedia data (e.g., slide 2 (200), audio 2 (210), video 2 (220), marking 2-1 (230), marking 2-2 (240)) may be stored in their respective sub-databases in a manner where the stored multimedia data is linked or otherwise associated with one another for belonging to the same subsequent presentation interval (e.g., the second presentation interval).

Identifying Associations of Data Entries in Database

As previously discussed, presentation intervals may be based on the times allotted to each slide in a presentation. Thus, in at least one embodiment, multimedia data for multimedia to content to be played back within the same presentation interval may be associated with one another based on their slide information. In this example, multimedia data for two multimedia—slide 1 (100) and audio 1 (110)—are associated to one another based on the slide information—Slide ID 001—linking both multimedia to slide 1 of the presentation. Similarly, multimedia data for slide 2 (200), audio 2 (210), video 2 (220), marking 2-1 (230), and marking 2-2 (240)—are associated with one another based on the slide information—Slide ID 002—linking each multimedia to slide 2 of the presentation. The associations of various database entries for such multimedia data are shown in FIG. 8, for example, through dashed lines across the same row of stored multimedia data. Furthermore, the time information for a given multimedia data may also be stored within the sub-database entry. However, as previously discussed, time information for a multimedia data (e.g., multimedia data for audio 1 (110) and audio 2 (210)) need not be stored if the start and end times for that multimedia data is the same as the presentation interval (e.g., the start and end time for the slide with which the multimedia data is associated with).

Reproducing Presentation Using Database

The entry of multimedia data for a presentation into the data structures of database 800, as shown in FIG. 8, allows the audience device or another computing device to efficiently reproduce the presentation. For example, the audience device may identify a sub-database (e.g., sub-database 810) as being controlling for the purposes of the presentation, for example, because the multimedia data stored in that sub-database (e.g., the slides of the presentation document) sets the presentation intervals and/or because other multimedia data form an association with the multimedia data. While the example described in FIG. 8 use slide data as the controlling multimedia data, this need not be so and it is contemplated that other multimedia data may be used (e.g., video segments, audio segments, etc.). After the sub-database storing the controlling multimedia data (e.g., the presentation document) is identified, the audience device may load the stored multimedia data for a first presentation interval. In this example, the first presentation interval may be identified by the slide information designating a slide as the first slide (e.g., slide ID 001) and/or by the time information indicating a slide as having the start time $t_1$. Next, other multimedia data (audio 1 (110) associated with the controlling multimedia (e.g., slide 1 (100)) may be identified and loaded. In the data structure shown in the database 800, the other multimedia data may be identified based on their associations (as shown via the dashed line and placement along the same row). After the multimedia data for one presentation interval are loaded, the audience device may proceed with performing substantially similar or same steps with the next presentation interval (e.g., corresponding the next slide). In the event where other associated multimedia data, despite having associations with the same controlling multimedia (e.g., the slide), have different time information, multimedia data having earlier start times may be loaded first. For example, video 2 (220) may be loaded before marking 2-1 (230), since video 2 (220) has an earlier start time, even though video 2 (220) and marking 2-1 are both associated with one another based on their occurrence within the same presentation interval of slide 2 (200). Thus, the audience device may efficiently store, synthesize, integrate, and/or reproduce a presentation from individual components and pieces of the presentation, thus overcoming the issues of size and bandwidth in conventional presentation distributions between computing devices.

Computing Devices and Systems

Furthermore, while the example database 800 is described as being used by the audience device for synthesizing the presentation, the example database 800 may also or alternatively be used by other computing devices, such as the presenter device or another computing system (e.g., a server). For example, in embodiments where the presenter device is used to generate multimedia data from a live or recorded presentation (e.g., a ZOOM call) for a distribution or redistribution of the presentation to an audience device for reproduction thereon, the presenter device may employ the database 800 and the techniques for data storage thus described for storing the multimedia data of the presentation. For example, the presentation device may detect slide changes from the live or recorded presentation to determine presentation intervals, store captured slides (e.g., through image capture), and store multimedia data corresponding to captured audio, video, and/or markings, including associations between multimedia data, according to the techniques thus described. Also or alternatively, a server may receive a presentation performed by the presenter using the presenter device, and the server may use the techniques of slide and other multimedia (e.g., video, audio, marking) detection and capture to determine presentation intervals, store captured slides (e.g., through image capture), and store multimedia data corresponding to captured audio, video, and/or markings, including associations between multimedia data, according to the techniques thus described. The server may cause or facilitate the transmission of, and/or directly transmit, the pieces and components of the presentation, along with the slide information and the time information for the pieces and components, to the audience device.

Computing Device

Figure 9:
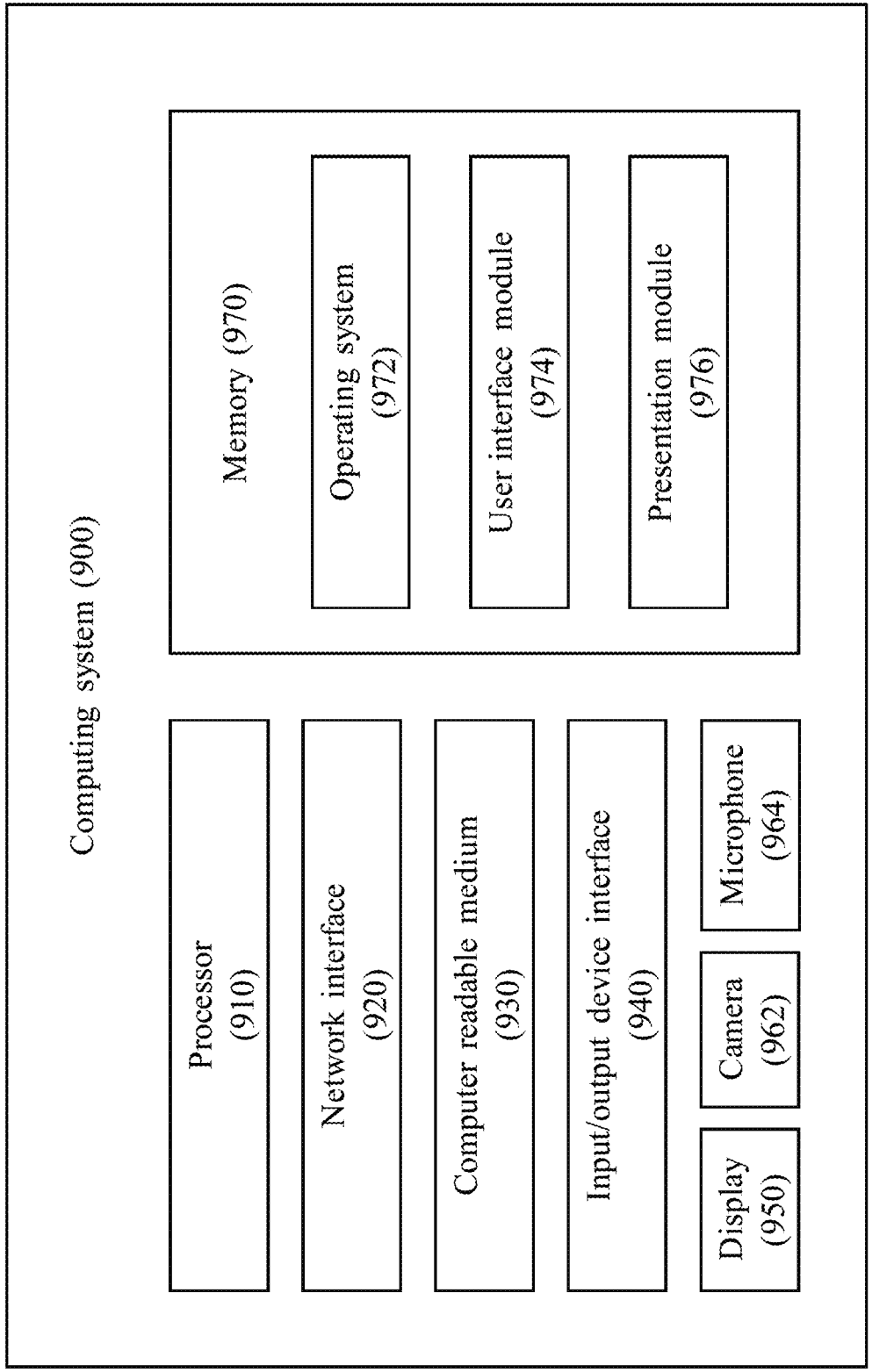
FIG. 9 is a block diagram illustrating an example computing system used for generating, transmitting, reproducing, and/or integrating multimedia contents for a presentation, according to an example embodiment of the present disclosure.
Figure 10:
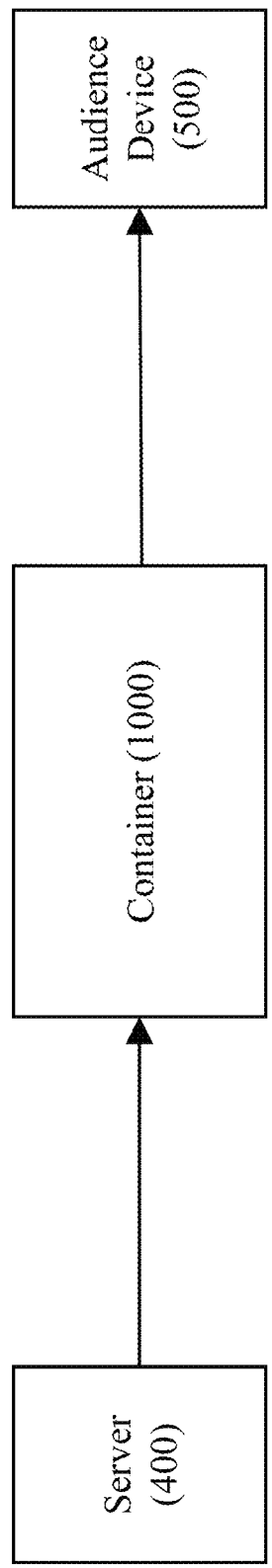
FIG. 10 is a block diagram illustrating transmission of multimedia presentation data using a container file according to an example embodiment of the present disclosure.

FIG. 9 is a block diagram illustrating an example computing system used for generating, transmitting, reproducing, playback and/or integrating multimedia contents for a presentation, according to an example embodiment of the present disclosure. The example computing system may be an example computing device used by the presenter device, the audience device, and/or another computing device used for generating, transmitting, reproducing, and/or integrating multimedia contents for the presentation. For example, the computing system 900 may comprise may comprise a stand-alone or portable computing device (e.g., a mobile device, personal digital assistant, laptop, tablet computers, desktop, etc.) having one or more of the subcomponents described herein for allowing a user (e.g., a presenter, an educator, a professional, an audience, a student, a client, etc.) to present, generate a presentation, transmit or receive the presentation, integrate or reproduce the presentation, and/or view the presentation. As shown in FIG. 9, the computing system 900 may include, but is not limited to, one or more of a processor 910, a network interface 920, a computer readable medium 930, an input/output device interface 940, a display 950, a camera 962, a microphone 964, and memory 970. Furthermore, the memory 970 may comprise, and/or store computer-executable or machine-readable instructions to run or execute, one or more of an operating system 972, a user interface module 974, and a presentation module 976.

Processor

The processor 910 may comprise any one or more types of digital circuit configured to perform operations on a data stream, including functions described in the present disclosure. The network interface 920 may allow the computing system (e.g., a presenter or audience device) to transmit data, receive data, and/or otherwise communicate with another computing system (e.g., an audience or a presenter device, respectively) over a communication network. For example, the respective network interface may comprise a wired interface (e.g., electrical, RF (via coax), optical interface (via fiber)), a wireless interface, a, modem, etc.

Computer Readable Medium

The computer readable medium 930 may comprise a medium capable of storing various components or pieces of the presentation (e.g., multimedia datum) in a format readable by a computing device. Examples of machine-readable media include magnetic media such as magnetic disks, cards, tapes, and drums, punched cards and paper tapes, optical discs, barcodes and magnetic ink characters. For example, in the process of creating and/or generating a presentation, a presenter may load additional multimedia content (e.g., audio and/or video files) for certain slides of a presentation document using the computer readable medium 930.

Input/Output Interface

The input/output device interface 940 may comprise a hardware or logic that transfers information between internal storage devices (e.g., memory 970, computer readable medium 930) and an external peripheral device (e.g., display 950, camera 962). For example, an audience device may load various components of a presentation (e.g., slide data, audio data, video data, and/or marking data for a given presentation interval) from a database (e.g., database 800) stored in the memory 970 and output said components to the display 950 suing the input/output device interface 940. The display 950 may comprise any form of an output device for presenting various aspects of the presentation in a visual and/or tactile form. The camera 962 may comprise any form of optical instrument for capturing images, e.g., for generating video data, detecting slide changes, and/or generating marking data from a live or recorded presentation. The microphone 964 may comprise any form of sound recording instrument for capturing audio, e.g., for generating audio data from a live or recorded presentation. The memory 970 may comprise any type of long term, short term, volatile, nonvolatile, or other memory and is not to be limited to any particular type of memory or number of memories, or type of media upon which memory is stored.

Instructions, Programs, Programmable Logic

The memory 970 may store instructions, programs, or programmable logic that, when executed or activated by the processor 910, can cause the computing system 900 to perform one or more methods discussed herein. For example, the operating system 927 may comprise one or more programs to coordinate the operations of hardware and software of the computing system 900 to perform methods described herein. The user interface module 974 may comprise one or more programs to coordinate user input for creating, generating, viewing, and/or interacting with presentations. Furthermore, the presentation module 976 may comprise a software and/or hardware component of the computing system 900 for generating, transmitting, reproducing, and/or integrating multimedia contents for the presentation according to techniques thus described. For example, the presentation module 976 may include computer executable instructions, programs, and/or programmable logic for storing multimedia content of a presentation to a database (e.g., database 800) that facilitates an effective integration of the presentation using, for example, associations between pieces of the presentation based on time information and slide information.

Playback Module

In embodiments, the computing system 900 may further include a playback module that are configured to receive data (container file) of a presentation from the server 400 (or the presenter device) and to reproduce the presentation. The playback module may include a software and/or hardware component of the computing system 900 for use in playback of the presentation. For example, the playback module may include computer executable instructions, programs, and/or programmable logic for requesting a container file of the presentation, receiving and analyzing the container file and playback one or more visual/audio elements in the container file.

Computer Programs or Components

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Container File
Container File

In embodiments, when or after a presenter conducts a presentation using presentation slides (for example, PowerPoint slides), a digital container file is generated. The container file includes contents needed to reproduce or play back the presentation. The container file includes a presentation document including one or more presentation slides. The container file includes an audio element recorded during the presentation and may further include at least one additional content element. Further, the container file may include timing information for playing the audio element and content element together with the slides as the presentation was performed. At least part of the slides and content elements of the container file may be replaced or edited after its generation. The container file may be shared or transmitted to users who wish to play back the presentation. The users may need playback software designed to use the slides, multimedia elements and timing information to reproduce the presentation.

Container Designed for Playback of Performance

In embodiments, the digital container file is specifically designed for playing back a past performance, offering a solution for reproducing presentations that have already been conducted. In this context, a performance encompasses a wide range of presentation scenarios, including those conducted using presentation documents such as PowerPoint slides. Additionally, a digital container file may be used to reproduce any performance that utilizes a background screen that switches among multiple backgrounds.

Container File Not Being a PowerPoint Document Containing Multimedia Elements

In embodiments, the container file includes presentation slides and multimedia elements recorded from a specific performance using the presentation slides. Conventional presentation document like a power point file includes multiple slides and multimedia elements can be included in one of the slides. However, the multimedia elements included in such a conventional presentation document cannot be those recorded from a specific performance using the conventional presentation document. For example, a PowerPoint document may include a video element on its slide, but the video element cannot be a recorded video of a past performance featuring the current PowerPoint side that includes the video element itself. On the other hand, for example, the container file may include a presentation slide and a video element that is a recorded video of a past performance using the presentation slide. While a container file enables reproduction of the presenter's speech, gestures, annotations, and real-time interactions with the slides, effectively recreating the dynamic nature of the original live presentation without requiring the presence of the original presenter, a PowerPoint file is designed for a future presentation that typically requires the original presenter's presence.

Content Element and Timing Information

In embodiments, the container may include one or more of (1) an audio recording of the presenter's voice captured, (2) a video recorded during the presentation featuring the presenter, (3) a visual object such as the presenter's handwriting on a slide, and (4) a sound effect presented during the presentation. The digital container file may include timing information indicating when each content element is to be played back in accordance with the original event timing of the presentation. By packaging all these elements together in a structured and orchestrated way, the digital container file enables audiences to experience the presentation as it was originally performed, complete with all the nuances and real-time elements that make live presentations engaging and informative.

Distinction From Video Files

In embodiments, a container file is not a video file in which audio and video data are encoded into a series of frames. The container file itself may not be played with software for playing video file formats such as MP4, MOV, AVI, etc. Instead, the container file serves as an aggregation of contents of the past (original) presentation. This includes slides and audio, as well as visual effects, images, videos, text, animations, and visual icons. As illustrated in FIG. 4 and FIG. 8, a container file may encompass a wide range of elements, such as slide data 410 and multimedia data 420-460. In embodiments, the container file maintains these elements as discrete, accessible, individually replaceable components rather than encoding them into a unified video stream.

File Size Advantage

In embodiments, when compared to a recorded video file of the presentation, a container file that allow a substantially same playback as the recorded video has a much smaller size. This reduction in size is due to the fact that the visual presentation of the slides constitutes a significant portion of the recorded video's size, while the slide data itself (for example, still image) is considerably smaller in comparison.

Generating Container File After Presentation

In embodiments, a process to generate the container file involves obtaining and organizing various data from a past or completed presentation, including presentation slides, content elements (such as speech, video, visual objects, sound effect) and timing of the content elements. In embodiments, the container file may be generated in real time during a live presentation using data of the completed parts of the presentation.

On-Demand Container Generation

In embodiments, a container file is generated in response to a request from a user. The user may select, among the data available, specific data to be included in the container file and the audience device generates and transmits the request accordingly. For example, the user may request to exclude particular data that is not of interest, or request to exclude data that does not match technical requirements (for example, network bandwidth, computing power of the audience device). Alternatively, the server 400 (or the presenter device) can generate a container file independent of a request from an audience device. Then, the server transmits the pre-generated container file in response to a request from the audience device 500.

Page Structure in Container File

Figure 11:
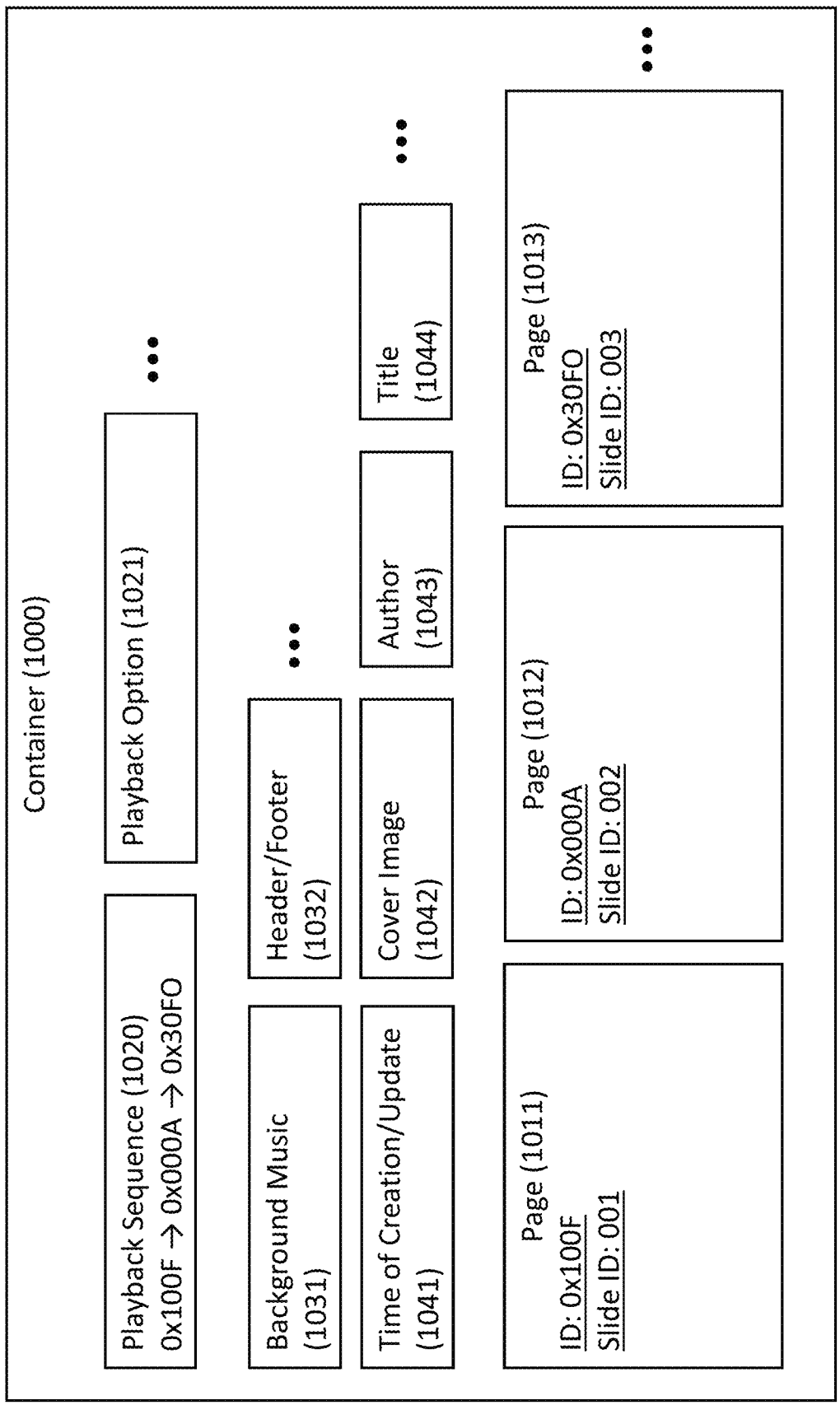
FIG. 11 is a block diagram illustrating an example container file according to an example embodiment of the present disclosure.

In embodiments, the container file may store data for playback of the presentation in one or more pages (subcontainers). In the example of FIG. 11, the container file 1000 includes three pages 1011, 1012, 1013 each corresponding respectively to Slide 001, Slide 002, Slide 003 of the presentation.

Slide Image Data in Page

Figure 13:
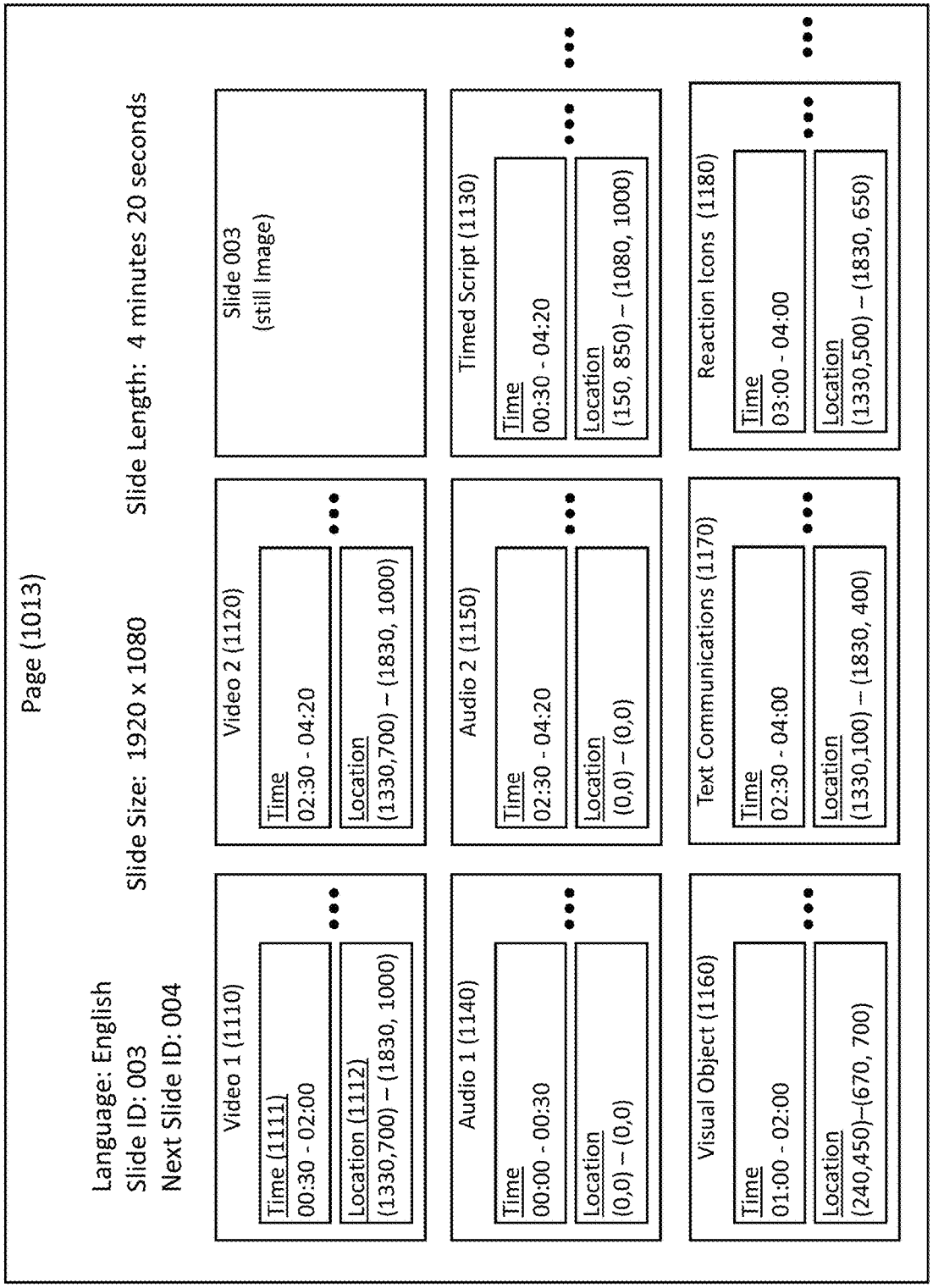
FIG. 13 is a block diagram illustrating an example page according to an example embodiment of the present disclosure.

In embodiments, a page may contain a slide used in the presentation. Referring to FIG. 13, the page 1013 includes a still image of its corresponding slide, Slide 003. In embodiments, a container file may contain a slide image outside its pages, and the slide image is linked to its corresponding page. Alternatively, the container file may reference an external slide image that is stored separately from the container file itself.

Metadata Specific to Slide

Figure 14:
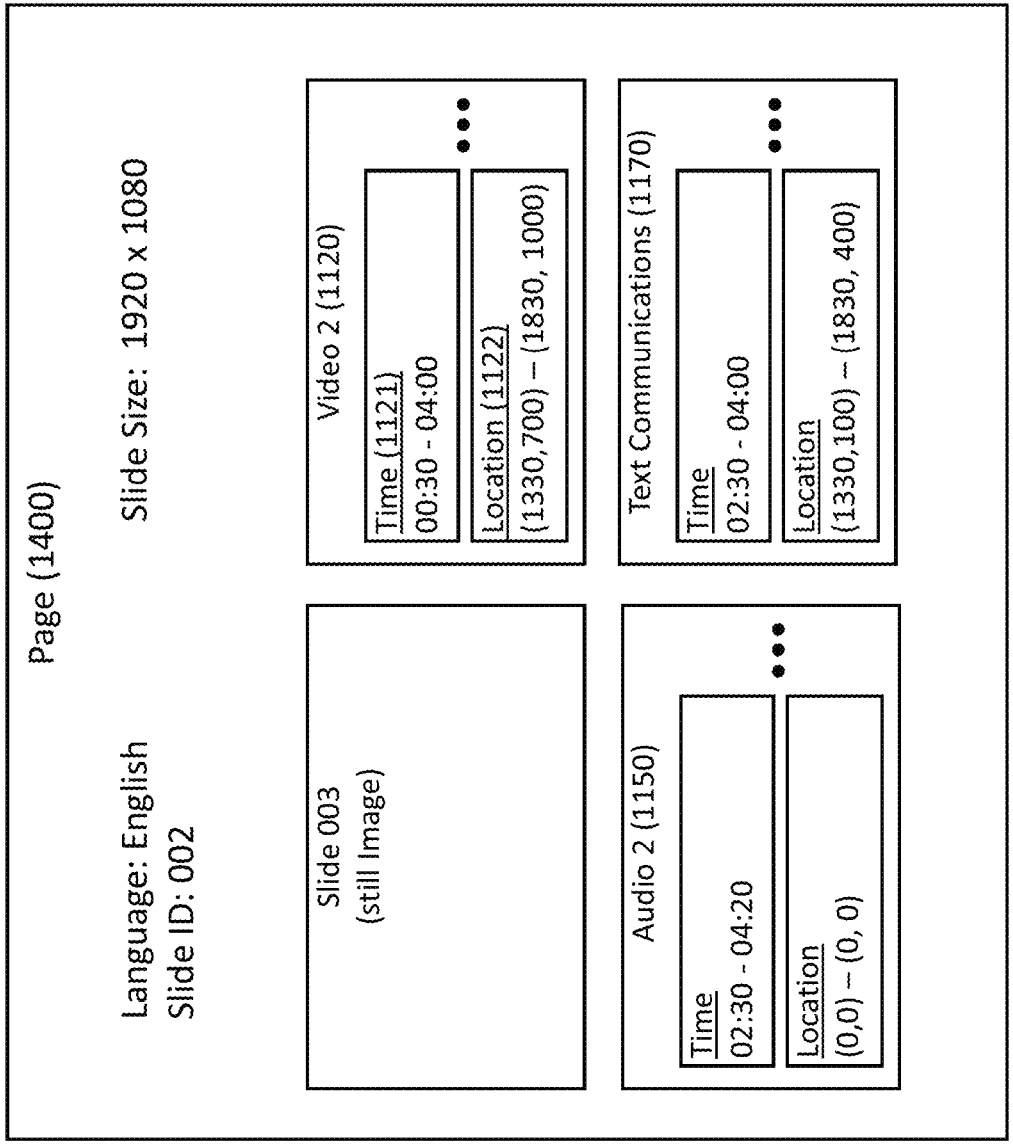
FIG. 14 is a block diagram illustrating another example page according to an example embodiment of the present disclosure.

Referring to FIG. 13 to FIG. 15, the page 1013 includes, a slide size (1920×1080), a slide length (4 minutes 20 seconds to display the slide), and the corresponding slide's ID (003). In embodiments, a page may store additional metadata other than the examples in FIG. 13 to FIG. 15, and may not include at least one of the examples.

One-To-One Correspondence Between Page and Slide

In embodiments, each page in the container file corresponds to a single slide of the presentation and contain data of the corresponding slide. Referring to FIG. 11 and FIG. 14, the page 1013 corresponds to Slide 003, and contains a still image of Slide 003 and multimedia data 1110-1180 for presenting with Slide 003. The audience device 500 may not refer to another page (page 1011 or page 1012) for presentation playback of Slide 003.

In embodiments, a single page corresponds to two or more slides and contain data of the two or more corresponding slides. In embodiments, a single slide corresponds to two or more pages and data of the slide is stored in the two or more corresponding pages.

Unique ID of Page

Referring to FIG. 11, in embodiments, each page has its unique identification (ID). The page 1012's ID is "0x000A", and the page 1013's ID is "0x30FO". These IDs are used for the Playback Sequence 1020. In embodiments, each page may not include a unique ID but may be identifiable using the ID of its corresponding slide. When a page one-to-one corresponds to a slide, the corresponding slide's ID or its equivalent can be used as the unique ID of the page. Referring to the container 1200 of FIG. 12, a page may use the corresponding slide's ID rather than having a separate unique ID.

Slide ID in Page

Referring to FIG. 11, each page 1011-1013 includes identification of its corresponding slide. For example, the page 1013 has Slide ID 003 as its metadata indicating the page is associated with Slide 003. In embodiments, a container may include information indicating an association between a page and a slide in a way other than the example of FIG. 11, such that a page corresponding to a particular slide can be identified using the slide's identification. For example, when there is a one-to-one correspondence between pages and slides, the third page in a playback sequence would correspond to the third slide of the presentation. Alternatively, the container file might use a mapping table that explicitly links page IDs to slide IDs, allowing for more flexible organization of pages and slides within the container.

Multimedia Data in Page

In embodiments, a page may contain multimedia data (visual/audio elements) of the presentation. In the example of FIG. 13, the page 1013 contains multimedia data 1110-1180 that is to be presented together with the corresponding slide (Slide 003) when the container file is played back. Alternatively, multimedia data may even be stored externally to the container file, with the container file including a link or metadata to access the external multimedia data.

Types of Multimedia Data (Elements) in Container File

Referring to FIG. 13, the page 1013 contains one or more visual/audio elements 1110-1180 to be presented together with Slide 003 for playback of the presentation. The page 1013 includes a first video element (video 1, 1110), a second video element (video 2, 1120) separate from the first video, a timed-script (subtitle) 1130, a first audio element (audio 1, 1140), a second audio element (audio 2, 1150), a visual object 1160, text communications 1170, and reaction icons 1180 (for example, a like icon or a smile icon). In embodiments, the page 1013 may store one or more additional elements other than the example of FIG. 13, and may not include one or more elements exemplified in FIG. 13.

Video Element

In embodiments, a video element in a container file may include, but is not limited to, one or more of the following: a video featuring the presenter (1140), a video of the audience, and a reference video presented during the presentation. These video elements provide visual context and enhance the overall presentation experience. A video element may be in a video file format such as MP4, MOV, AVI, etc. A video element may correspond to the video data 430 in FIG. 4, and description made in connection with the video data 430 may be applicable to the video element.

Audio Element

Audio elements may include, but are not limited to, the presenter's speech, background music, and sound effects. These elements contribute to the auditory dimension of the presentation, enhancing engagement and information retention. Audio elements (for example, 1140, 1150) in a container file may correspond to the audio data 420 of FIG. 4 and description made in connection with the audio data 420 may be applicable to these elements.

Visual Object Element

Visual object elements may include, but are not limited to, handwritten markings, animations, visual effects, highlights, and graphical icons. Visual object elements enhance the visual appeal and clarity of the presentation, helping to emphasize key points and illustrate concepts. In embodiments, visual object elements are distinct from video elements in that they are not stored in a video file format. Instead, they are typically represented as vector graphics, animations, or other non-video formats that can be easily scaled and modified. Visual object elements (for example, 1160) in a container file may correspond to the marking data 450, 460 in FIG. 4, and description made in connection with this marking data may be applicable to the visual object elements.

Text/Reaction Element

The container file may also include text communications (1170) and reaction elements (1180). Text communications may include a timed log of comments from the audience when the presentation was given or recorded. Reaction elements may include a timed log of icons (for example, like icons or smile icons) representing audience reactions during the presentation. These elements capture the interactive aspects of the presentation, providing valuable feedback and context for future viewers.

Playback Parameter for Multimedia Elements

In embodiments, the container file includes parameters for playback of multimedia elements. These parameters typically include timing and location information, but may also encompass additional element-specific metadata. For example, an element may include one or more conditions for allowing or prohibiting playback of a particular element.

Playback Timing of Element

Referring to FIG. 13 and FIG. 15, the page 1013 defines, for each of the element 1110-1180, timing for presenting the element together with the corresponding slide (Slide 003) such that the playback software reproduces the elements based on the timing defined. For example, for the video 1 (1110) has its start time of 00:30 (minute:second) and the end time of 02:00 from the start of Slide 003 (00:00, switching from Slide 002). In embodiments, the page 1013 may define timing in a format different from the example of FIG. 12, for example, in a frame number or in a time with reference to a different time other than the switching from Slide 002. In embodiments, the page 1013 may not define a playback timestamp for an element, and instead define a sequence of element playback such that the element can be playback timely according to the sequence (for example, immediately after following it preceding element in the sequence).

Playback Timing References

In embodiments, referring to FIG. 13 to FIG. 15, playback timing of an element is defined as the time from the start of the corresponding slide (i.e., when switching from the previous slide). In other embodiments, the start of the presentation can be used as a reference point for all pages. Alternatively, a time reference other than the slide switching or the start of the presentation can be used as a reference to define playback timing. Furthermore, different pages within the same container file may use different references for their timing information.

Location of Element

In the embodiments, referring to FIG. 13 and FIG. 15, the page 1013 defines, for each element 1110-1180, a location for presenting the element on a display of the audience device 500. According to FIG. 13, the page 1013 defines a screen size (slide size) of 1920×1080 (pixels). In the screens of FIG. 16 to FIG. 19, the left-top corner's coordinate is (0,0) and the right-bottom corner's coordinate is (1920, 1080). According to FIG. 13, the page 1013 defines a playback location for each element such that the playback software may generate visual representation of the elements based on the playback location. For the audio elements 1140, 1150, the page 1013 uses (0,0) as location of two corners such that the audio elements would have no visual representation on the screens of FIG. 16 to FIG. 19. In embodiments, a page may define a playback location in a format different from the example of FIG. 12, and may not define a playback location for non-visual elements (for example, audio).

Content Specific to Slide

In embodiments, a content in the container file is specific to its corresponding slide, allowing the playback software to identify any content to be played back together with a particular slide. The container file may include information indicating correspondence (association) between content elements and presentation slides, or is organized such that the playback software can identify contents of a particular slide. A content element specific to a slide may be identifiable based on its link, association, or organization with the slide using the slide's unique identification. For example, referring to FIGS. 11 and 13, the page 1013 one-to-one corresponds to Slide 003 and includes contents to be played back together with Slide 003.

Container File Metadata Other Than Page

In embodiments, in addition to the pages, the container file may include metadata for use in playback of the presentation. In the example of FIG. 11, the container file 1000 includes (1) a playback sequence 1020 which defines order among the pages, (2) playback option 1021 which defines one or more of default language, default playback speed, a setting for auto-play, and a setting for auto-repeat, (3) a background music 1031, (5) a header and a footer common for all slides, (6) a time of creation or update 1041 indicating when the container was generated or updated, (7) a cover image of the presentation other than content slides, (8) an author of the presentation 1043, (9) a tile of the presentation. The container file 1000 may include, separate from the pages, metadata for use in playback of the presentation at the audience devoice. The metadata may include information that is applicable for all slides of the presentation or information that does not belong to belong to any specific slide. In embodiments, the container file 1000 may store additional data other than the example of FIG. 11, and may not include at least one of the example data in FIG. 11.

Multiple Versions of Page for Different Languages

Figure 12:
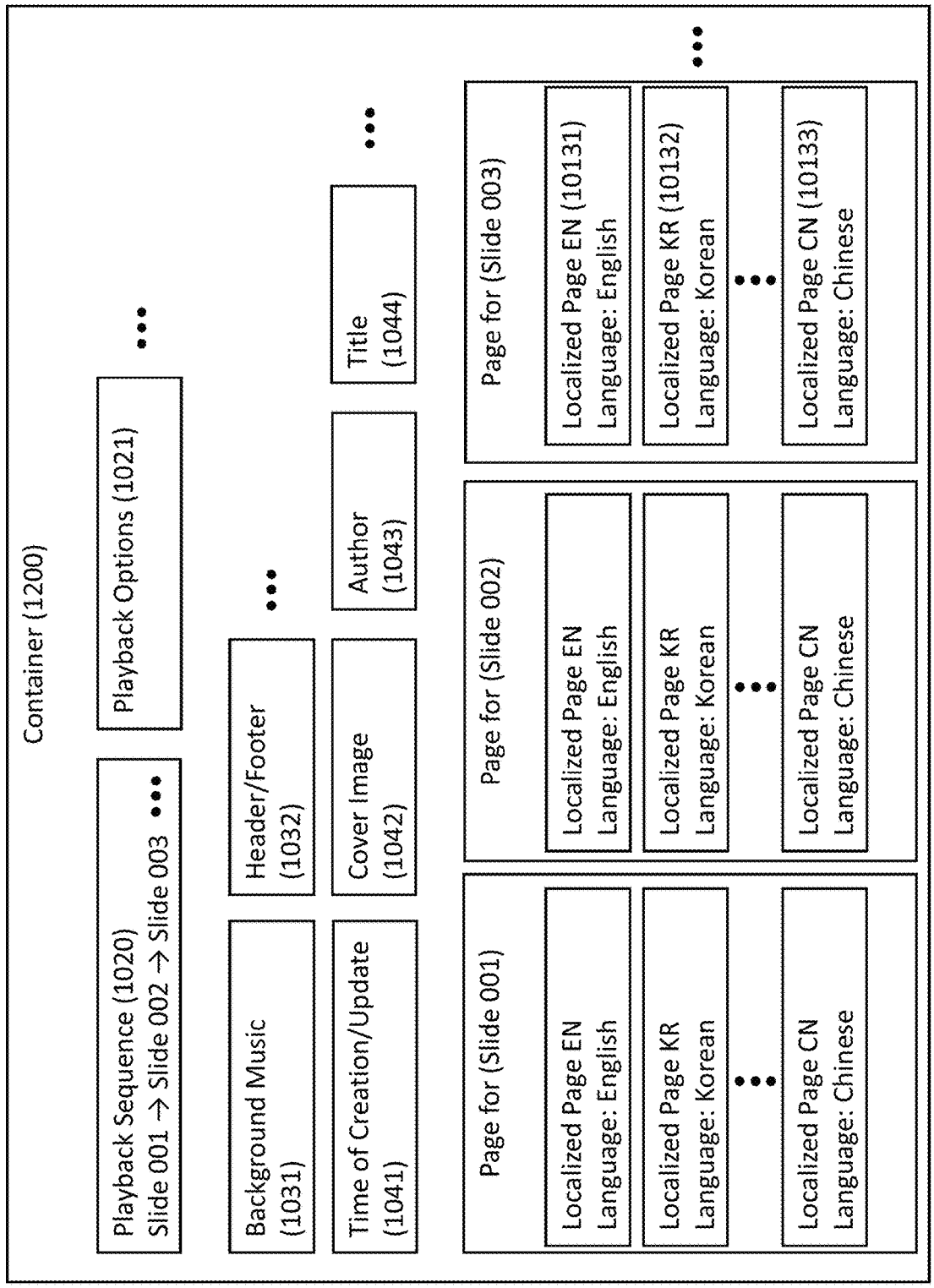
FIG. 12 is a block diagram illustrating another example container file according to an example embodiment of the present disclosure.

In embodiments, as shown in FIG. 12, the container file 1200 includes, for a single slide, multiple versions (localized pages) of pages in different languages. The localized page EN 10131 is an English version of the page for Slide 003. The localized page EN 10131 may be the same as the page 1013 shown in FIG. 13. The localized page KR 10132 is a Korean-language equivalent of the localized page EN 10131, and the localized page CN 10133 is a Chinese-language equivalent of the localized page EN 10131.

Page-By-Page Update Capability

In embodiments, the container file 1000 can be updated by modifying or removing individual pages without affecting the other pages. Such page-by-page updating may be more time-efficient than editing a video recording of the presentation. When the content for a single slide is packaged in a single page, the container file can be updated slide-by-slide by modifying only the single page corresponding to the particular slide. This granular update capability allows for efficient revisions and maintenance of the presentation content, enabling presenters to easily refine or update specific portions of their presentations without the need to recreate the entire container file.

Single Container File for Single Presentation

In embodiments, a single container file is generated for playback of the presentation. The audience device 500 may ready to play back the presentation on receiving the single container file. Alternatively, a presentation may be split across two or more container files. In embodiments, a single container file may package data from multiple presentations. For example, when there are two or more presentations performed suing the same presentation slides, data of the two or more presentations may be packaged into a single container files.

Playback Process of Past Presentation

In embodiments, the audience device 500 performs a playback process to reproduce the multimedia presentation using a playback software (installed the audience device 500 or working on a cloud environment). In embodiments, the playback process may include one or more steps of (1) receiving from a user's request for a presentation, (2) obtaining one or more container files of the presentation from the server 400—each container including one or more pages, (3) obtaining one or more slide(s) of the presentation when the slide(s) are not in the container files, (4) processing metadata of the container file(s) to determine or identify parameter(s) of the presentation playback including but not limited to a sequence of slides and page(s) corresponding to individual slides, (5) process metadata of the corresponding page(s) of a slide, to determine or identify parameter(s) of the presentation playback for the slide (6) presenting the slide referencing to element data of the corresponding page(s), (6) presenting elements of the corresponding page(s) along with the current slide, (7) switching to the next slide on completion of presentation playback of the current slide, and (8) repeating the steps of (5) to (7) until playback of the last slide is completed. In embodiments, a playback process of a presentation may include one or more steps other than the example steps, and may not include at least one of the example steps.

Modification of Container Prior to Transmission

In embodiments, a server (or presenter device) may modify a pre-generated container file before transmitting it to the audience device 500. This modification process takes into account characteristics and limitations of the audience device and its network connection. For instance, if the audience device has limited processing power or storage capacity, the server may optimize the container file by reducing the resolution of video content or compressing audio files. Similarly, in cases of limited network bandwidth, the server may remove high-bandwidth elements or replace them with lower-quality alternatives.

Playback Software

In embodiments, a playback software (player program) reproduces the presentation on the audience device using data of the container file. The playback software may be a program/application installed on the audience computing device or program/application working in a cloud computing environment.

Container File Format Known to Playback Software

In embodiments, a container file is generated in a predetermined format known to the playback software, such that playback software may access information in the container file and provide playback of the presentation as intended. According to the predetermined format, the playback software is capable of locating a sequence of slides, a slide to display, one or more parameters for displaying the slide, one or more content elements that is linked to the slide in the container file, and one or more parameters for playing back of the content elements.

Playback After Downloading Entire Presentation

In embodiments, the audience device 500 may starts a playback of the presentation after downloading all container file(s) of the presentation such that the audience device provides a playback of the entire presentation locally without requiring additional data from the server.

Streaming of Presentation (Slide-By-Slide, Page-By-Page)

In embodiments, when a user request playback of one or more particular slide(s), the audience device 500 may request the server 400 to provide a container file only for the request slide(s) rather than the entire slides. In response, the service may generate a container file that does not include a page of the other slide(s) and transmit the container file to the audience device 500. The audience device 500 may starts a playback of the request slide(s) without obtaining (or waiting for) all pages of the presentation. In embodiments, the audience device 500 may automatically obtain or download page(s) of subsequent slide(s) such that playback of the subsequent slide(s) is ready while playback of the requested slide (page buffering). In embodiments, page(s) of different slides can be transmitted in separate container files for a slide-by-slide streaming of the presentation playback. In embodiments, for a page-by-page streaming, each page of a presentation can be transmitted individually as a single-page container.

Slide Switching After Playback of Last Element

Referring to the timeline of FIG. 15, the video 2 (1120) and the audio 2 (1150) are the last elements for Slide 003. In embodiments, the audience device 500 starts playback for the immediately following slide (Slide 004) automatically after confirming completion of playback of the last element(s) of the current slide. In embodiments, the audience device 500 starts playback for Slide 004 automatically when a time lapsed from the start of the switching to Slide 003 (from Slide 002) reaches the length of presentation playback for Slide 003 (4 minutes 20 seconds). In embodiments, the audience device 500 may not starts playback for Slide 004 until completion of playback of the last element (the video 2 or and the audio 2) regardless when a time lapsed from the start of the switching to Slide 003.

Maintaining Substantial Synchronization During Presentation Playback

In embodiments, when two events (for example, a video start and an audio start) are synchronized during a container file's presentation(s) (previously performed presentation(s) from which contents of the container file were recorded or generated), data of corresponding page elements are configured to maintain the synchronization in a play back of the container file. For example, when a video and an audio started at the same time in the presentation, an element corresponding the video and another element corresponding the audio may have the same timing for their start such that an audience watching playback of the presentation may not notice asynchronism or dissonance between the audio and the video. In embodiments, two elements of a page (slide) can be substantially synchronized by having the same time stamp (for example, start time), but two elements may not be in the perfect synchronization due to any technical reason. In embodiments, when it is said that a first event occurs (or is) at or about the time (or point) of a second event, it can mean that the first event and the second event occurs at substantially same time (for example, within 1, 10, 20, 40, 50, 75, 100, 300, 500 milliseconds including perfect synchronization) such that a person may not notice asynchronism or dissonance between the two events. In embodiments, when it is said that a time (point) is at or about a reference time (point), it can mean that the time point is the same or substantially same as the reference time (point), for example, within 1, 10, 20, 40, 50, 75, 100, 300, 500 milliseconds.

Example Screens

Figure 16:
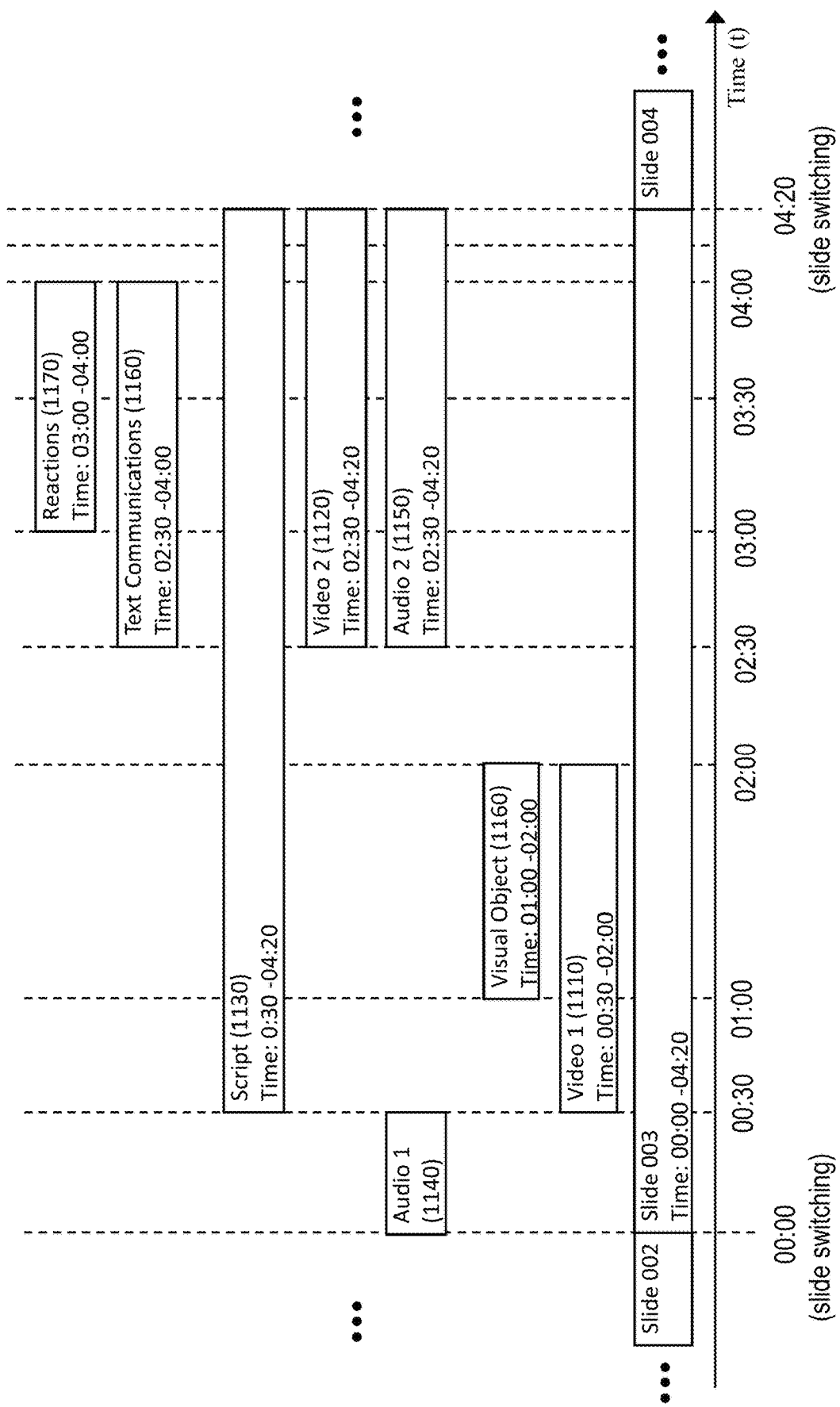
FIG. 16 is a time line of elements according to the example page of FIG. 13.
Figure 17:
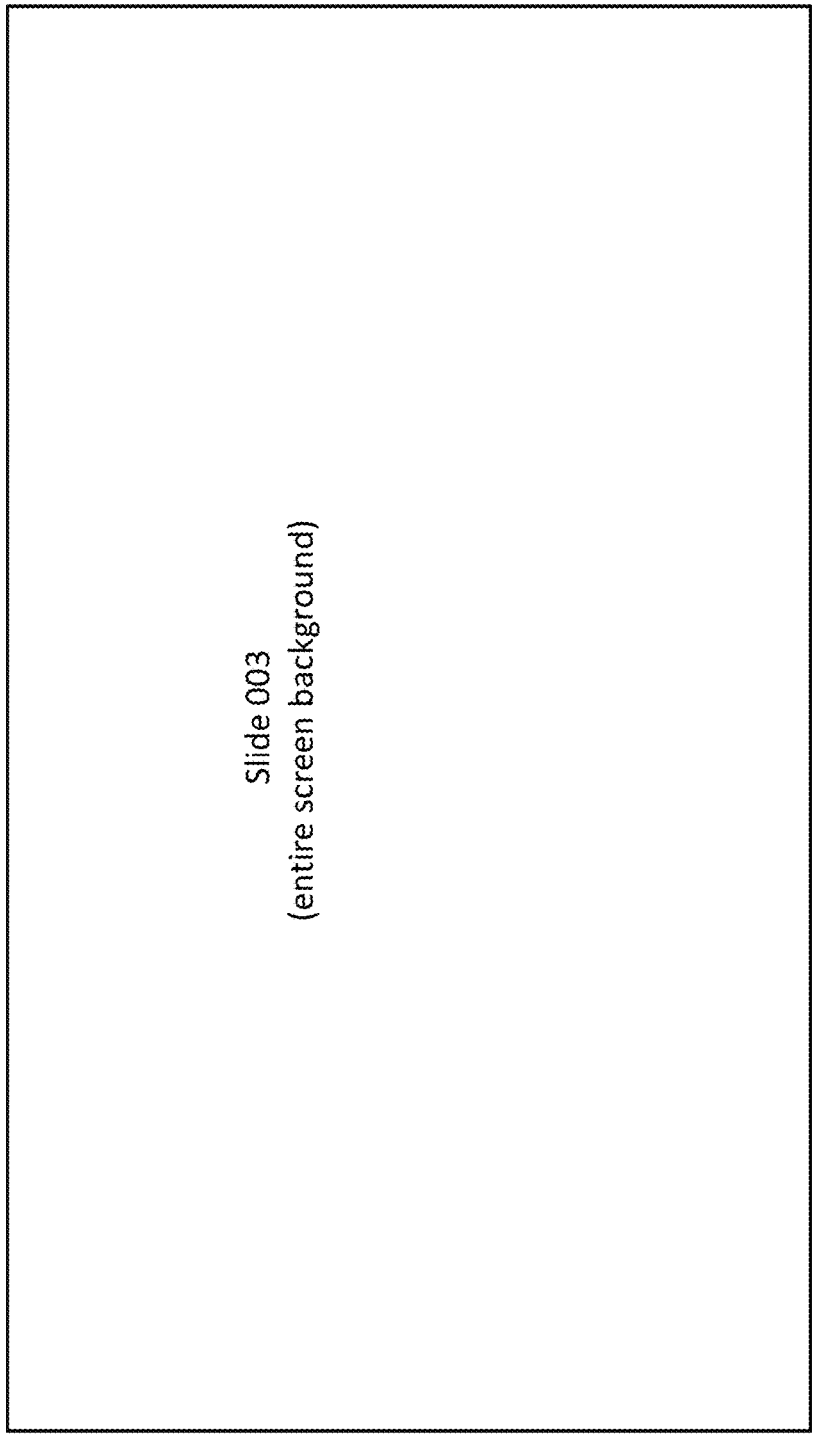
FIG. 17 illustrates an example display of an audience device generated using the page of FIG. 13.
Figure 18:
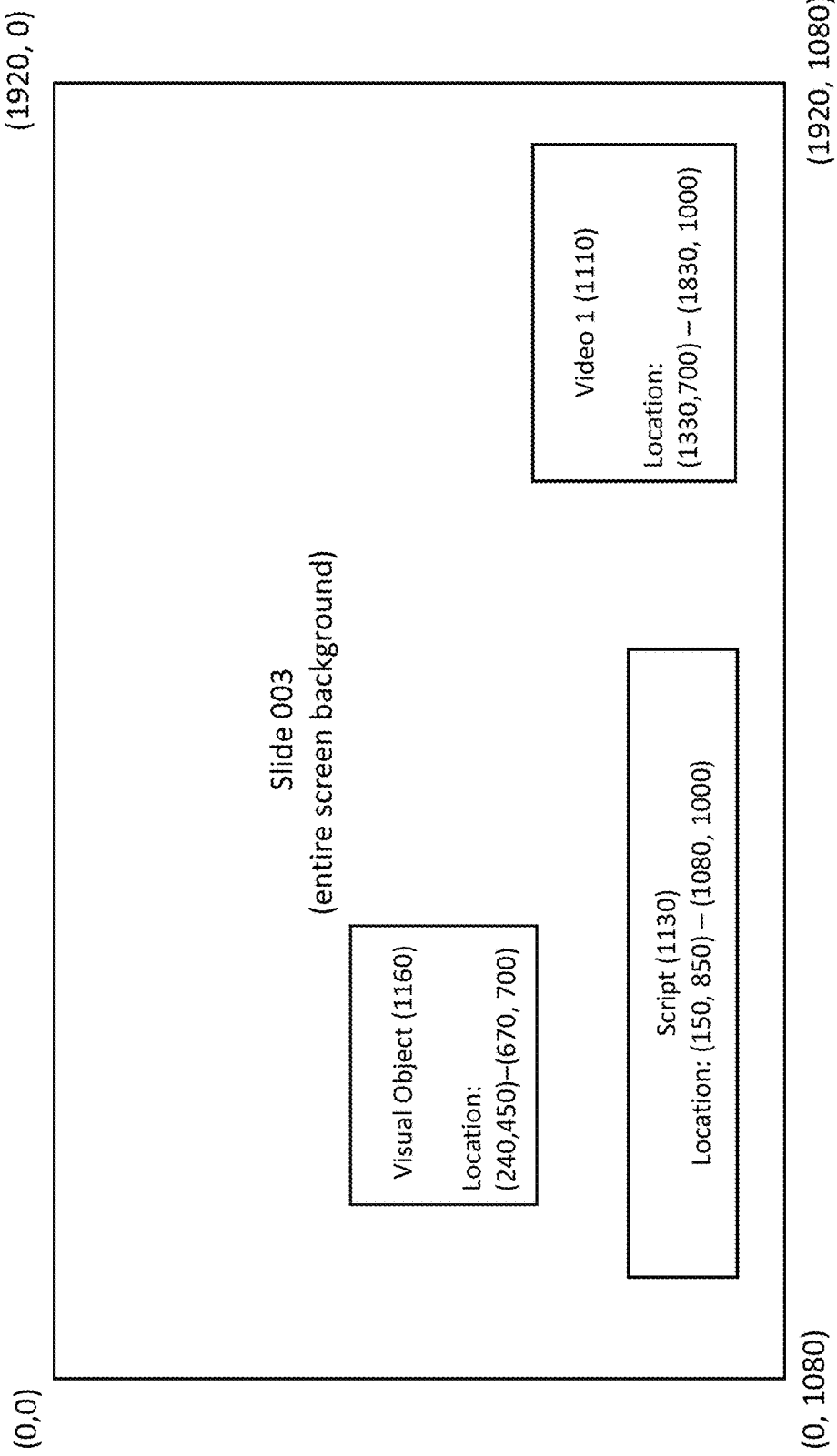
FIG. 18 illustrates another example display of an audience device generated using the page of FIG. 13.
Figure 20:
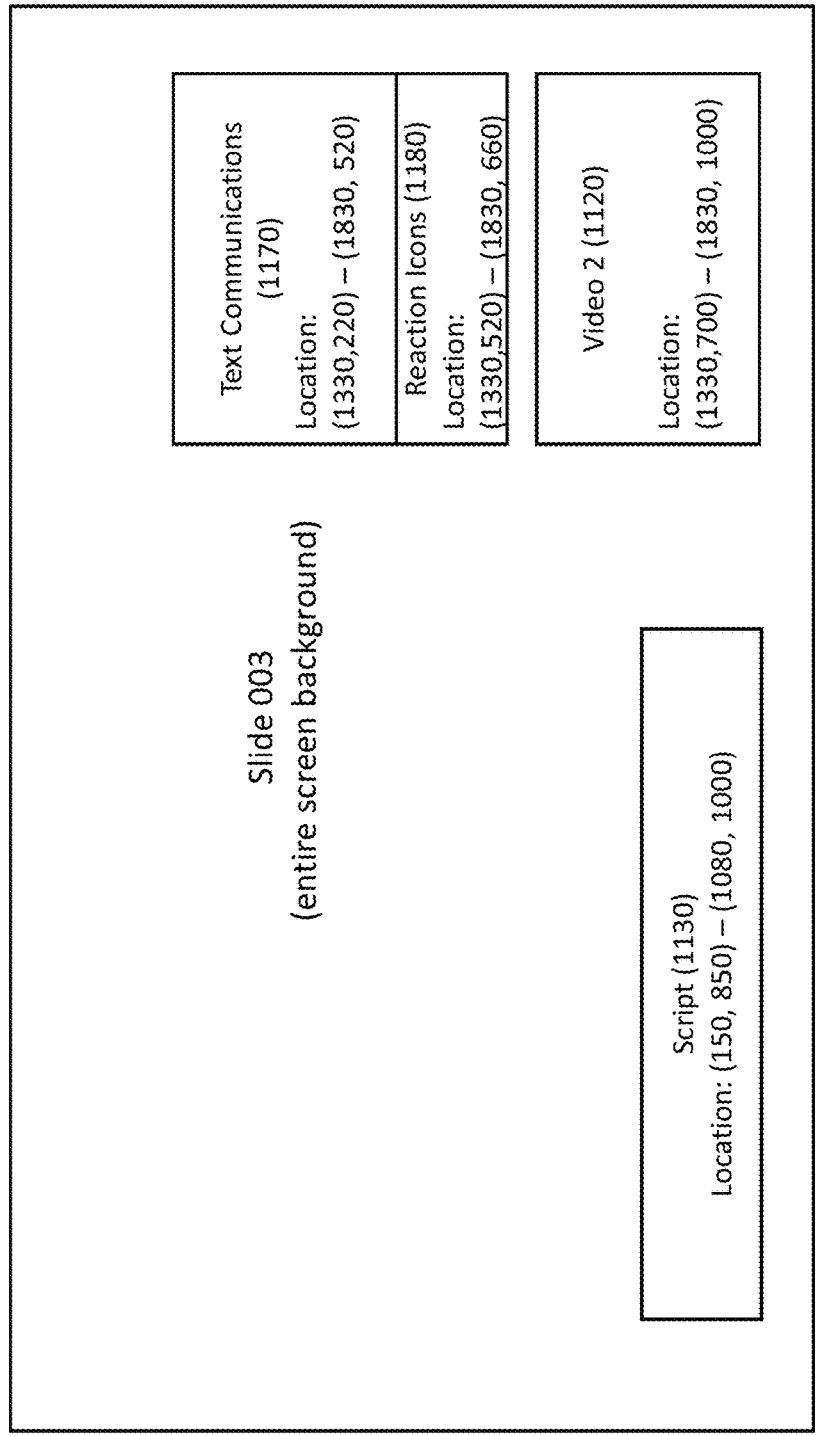
FIG. 20 illustrates another example display of an audience device generated using the page of FIG. 13.

FIG. 17 to FIG. 20 show changes in the audience device's screen according to the timeline of FIG. 16. FIG. 17 illustrates a screen of the audience device 500 after 10 seconds from the start of Slide 003. FIG. 18 illustrates a subsequent screen of the audience device 500 after 1 minutes from the start of Slide 003. According to the playback timing and playback location defined in the page 1013, the audience device 500 displays Slide 003 as background and further displays the video 1110, the visual object 1160, and the script 1130. FIG. 19 illustrates a subsequent screen after 1 minute and 30 seconds from the start of Slide 003. When compared to the screen of FIG. 18, the visual object 1160 is no longer displayed. FIG. 20 illustrates a subsequent screen after 3 minute and 50 seconds from the start of Slide 003. When compared to the screen of FIG. 19, Text Communications 1170 and Reaction Icons 1180 are additionally presented above the Video 2 (1120).

Changes and Modifications Example Embodiments

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Furthermore, while specific embodiments have been described, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A digital container file containing data for reproduction of a previously performed presentation that used a plurality of slides comprising a first slide and a second slide, the digital container file comprising:
　slide data for reproduction of the plurality of slides used during the previously performed presentation, the slide data comprising:
　　a first slide datum configured for reproducing the first slide; and
　　a second slide datum configured for reproducing the second slide that is immediately subsequent to the first slide;
　audio data for reproduction of audios of the previously performed presentation, the audio data comprising:
　　a first audio datum associated with the first slide and configured for reproducing a first audio that was recorded while the first slide was being displayed or referenced during the previously performed presentation; and
　　a second audio datum associated with the second slide and configured for reproducing a second audio that was recorded while the second slide was being displayed or referenced during the previously performed presentation;
　video data for reproduction of videos of the previously performed presentation, the video data comprising:
　　a first video datum configured for reproducing a first video that was recorded while the first slide was being displayed or referenced during the previously performed presentation; and
　　a second video datum associated with the second slide and configured for reproducing a second video that was recorded while the second slide was being displayed or referenced during the previously performed presentation; and
　visual object data for reproduction of visual objects generated and displayed during the previously performed presentation, the visual object data comprising:
　　a first visual object datum associated with the first slide and configured for reproducing a first visual object that was generated and displayed while the first slide was being displayed during the previously performed presentation; and a second visual object datum associated with the second slide and configured for reproducing a second visual object that was generated and displayed while the second slide was being displayed during the previously performed presentation, wherein the digital container file comprises a plurality of pages comprising a first page containing data associated with the first slide and a second page containing data associated with the second slide such that the first page contains the first slide datum, the first audio datum, the first video datum, and the first visual object datum and further such that the second page contains the second slide datum, the second audio datum, the second video datum, and the second visual object datum, wherein the digital container file further comprises non-slide-specific data that are not associated with any specific slide of the plurality of slides and are contained outside the plurality of pages, wherein the non-slide-specific data comprises a slide sequence datum indicating a sequence of the plurality of slides in the previously performed presentation in which the second slide is immediately subsequent to the first slide, wherein the digital container file is not in a video file format, wherein the first slide datum and the second slide datum are not in a video file format, wherein at least one of the first video and the second video are in a predetermined video file format, wherein the first visual object datum and the second visual object datum are not in a video format, wherein the first visual object datum and the first video are not combined in a video format.

2. The digital container file of claim 1, wherein the previously performed presentation was performed by at least one presenter, wherein the first audio features the at least one presenter's voice, wherein the first video features the at least one presenter.

3. The digital container file of claim 1, further comprising a first audio time stamp for reproducing the first audio at a first audio time relative to at least one reference point while the previously performed presentation is to be reproduced, and a second audio time stamp for reproducing the second audio at a second audio time relative to the at least one reference point or another reference point while the previously performed presentation is to be reproduced.

4. The digital container file of claim 3, wherein the other reference point that the second audio time is relative to is different from the other reference point that the second video time is relative to.

5. The digital container file of claim 3, wherein the other reference point that the second audio time is relative to is identical to the other reference point that the second video time is relative to.

6. The digital container file of claim 3, wherein the first audio time and the second audio time are relative to the same reference time.

7. The digital container file of claim 3, wherein the first audio time is at or about a point at which the first slide starts while the previously performed presentation is reproduced.

8. The digital container file of claim 3, wherein the second audio time is at or about a point at which the first slide is switched to the second slide while the previously performed presentation is reproduced.

9. The digital container file of claim 1,
wherein the first video datum comprises a location of the first video with reference to the first slide,
wherein the first visual object datum comprises a location of the first visual object with reference to the first slide.

10. The digital container file of claim 9,
wherein the first visual object datum comprises a time to display the first visual object along with the first slide.

11. The digital container file of claim 9,
wherein the first page further comprises a timed script for displaying subtitle along with the first slide.

12. The digital container file of claim 11, wherein the digital container file further comprises a first-second slide switching time stamp indicative of a first-second slide switching time for switching from the first slide to second slide while the previously performed presentation is to be reproduced, wherein the first-second slide switching time stamp is contained neither in the first page nor in the second page.

13. The digital container file of claim 1,
wherein each of the plurality of pages has a unique identification, wherein the slide sequence datum specifies the sequence of the plurality of slides using the unique identifications of the plurality of pages.

14. The digital container file of claim 1,
wherein the first page comprise a plurality of sub-pages comprising a first language sub-page and a second language sub-page, wherein the first language sub-page contains a first language datum for playing back a first slide portion of the previously performed presentation in a first language, wherein the second language sub-page contains a second language datum for playing back the first slide portion of the previously performed presentation in a second language.

15. The digital container file of claim 14,
wherein the second page comprise a plurality of sub-pages comprising a first language sub-page and a second language sub-page, wherein the first language sub-page contains a first language datum for playing back a second slide portion of the previously performed presentation in the first language, wherein the second language sub-page contains a second language datum for playing back the second slide portion of the previously performed presentation in the second language,
wherein if the first slide portion of the previously performed presentation is played back in the second language using the second language datum of the second language sub-page of the first page, the digital container file is configured to subsequently play back the second slide portion of the previously performed presentation in the second language using the second language datum of the second language sub-page of the second page.

16. The digital container file of claim 1, wherein the digital container file is configured to generate a first video content featuring the first slide, the first video, and the first visual object, even if neither the first slide datum nor the first visual object datum is in a video format.

17. The digital container file of claim 1, wherein the first visual object comprises a first marking to be overlaid on the first slide, wherein the first visual object datum comprises first position information indicative of a first coordinate value for the first marking and a first marking time stamp for generating the first marking on the first slide.

18. The digital container file of claim 1, wherein the slide data comprises multiple sets of slide datum comprising a first set in a first language and a second set in a second language, wherein the first set comprise one or more slides in the first language and the second set comprise a second-language equivalent of the one or more slides.

19. The digital container file of claim 1, wherein the digital container file comprises a first set of pages and a second set of pages, wherein the first set comprises a first page and a second page for presentation in a first language, wherein the first page comprises the first slide datum, the first audio datum, the first video datum, and the first visual object datum, wherein the second page comprises the second slide datum, the second audio datum, the second video datum, and the second visual object datum, wherein the second set comprises a second-language equivalent of the first page in a second language of and a second-language equivalent of the second page in the second language.

20. The digital container file of claim 1, wherein each of the plurality of slides is a still image slide.

21. The digital container file of claim 1, wherein the previously performed presentation was performed by at least one presenter with no other audience, wherein the first audio and the second audio comprise voice of the at least one presenter but no reaction from audience.

22. A method of generating the digital container file of claim 1, the method comprising:
  providing a presentation document comprising a plurality of slides which comprises a first slide and a second slide;
  providing content elements of a previously presentation performed by at least one presenter using the presentation document,
  wherein the content elements comprise:
    the first audio recorded while the first slide was being displayed or referenced during the previously performed presentation;
    the first video that was recorded while the first slide was being displayed or referenced during the previously performed presentation;
    the first visual object that was generated and displayed while the first slide was being displayed during the previously performed presentation,
    the second audio that was recorded while the second slide was being displayed or referenced during the previously performed presentation
    the second video that was recorded while the second slide was being displayed or referenced during the previously performed presentation, and
    the second visual object that was generated and displayed while the second slide was being displayed during the previously performed presentation;
  generating:
    the first slide datum configured for reproducing the first slide,
    the first audio datum configured for reproducing the first audio,
    the first video datum configured for reproducing the first video,
    the first visual object datum configured for reproducing the first visual object,
    the second audio datum configured for reproducing the second audio,
    the second video datum configured for reproducing the second video, and
    the second visual object datum configured for reproducing the second visual object; and
  creating the digital container file comprising the first slide datum, the first audio datum, the first video datum and the first visual object datum, the second audio datum, the second video datum, and the second visual object datum.

* * * * *